US007177376B2

(12) United States Patent
Atungsiri et al.

(10) Patent No.: US 7,177,376 B2
(45) Date of Patent: Feb. 13, 2007

(54) APPARATUS AND ASSOCIATED METHOD OF SYMBOL TIMING RECOVERY USING COARSE AND FINE SYMBOL TIME ACQUISITION

(75) Inventors: Samuel Asangbeng Atungsiri, Basingstoke (GB); John Nicholas Wilson, Hook (GB)

(73) Assignee: Sony United Kingdom Limited, Weybridge (GB)

( * ) Notice: Subject to any disclaimer, the term of this patent is extended or adjusted under 35 U.S.C. 154(b) by 836 days.

(21) Appl. No.: 10/175,368

(22) Filed: Jun. 18, 2002

(65) Prior Publication Data

US 2003/0016773 A1    Jan. 23, 2003

(30) Foreign Application Priority Data

Jun. 20, 2001    (GB) .................................... 0115061

(51) Int. Cl.
*H04L 7/00*    (2006.01)
*H04L 7/04*    (2006.01)

(52) U.S. Cl. ...................................... 375/343; 375/362
(58) Field of Classification Search ................ 375/371, 375/139, 143, 145, 149, 152, 343, 367, 366, 375/365, 362, 350, 260, 261, 130, 216, 265, 375/354, 355, 359, 368, 224; 370/503, 509, 370/510, 515, 512, 513, 203, 204, 208–211, 370/215, 350, 330

See application file for complete search history.

(56) References Cited

U.S. PATENT DOCUMENTS 6,459,744 B1 * 10/2002 Helard et al. ................ 375/354

6,614,864 B1 * 9/2003 Raphaeli et al. ............ 375/371
6,618,452 B1 * 9/2003 Huber et al. ................ 375/343
7,106,709 B2 * 9/2006 Davidsson et al. .......... 370/330

FOREIGN PATENT DOCUMENTS

EP    0 615 352    9/1994

OTHER PUBLICATIONS

Yang B. et al., "Timing Recovery for OFDM Transmission", IEEE Journal on Selected Areas in Communications, IEEE Service Center, Piscataway, NJ, US, vol. 18, No. 11, Nov. 2000, pp. 2278-2291, XP001063613, ISSN: 0733-8716.
Lee D. et al., "A New Symbol Timing Recovery Algorithm for OFDM Systems", IEEE Transactions on Consumer Electronics, IEEE Service Center, New York, NY, US, vol. 43, No. 3, Aug. 1997, pp. 767-774, XP000742560, ISSN: 0098-3063.

* cited by examiner

*Primary Examiner*—Mohammed Ghayour
*Assistant Examiner*—Sophia Vlahos
(74) *Attorney, Agent, or Firm*—Oblon, Spivak, McClelland, Maier & Neustadt, P.C.

(57) ABSTRACT

A receiver determines a symbol synch time for recovering data from a symbol of signal samples generated in accordance with Orthogonal Frequency Division Multiplexing. Each symbol includes a guard period which carries data repeated from a data bearing part of the symbol and pilot signal samples. The receiver compromises a pilot assisted tracker, a guard adapted filter processor and a filter controller. The controller is operable to excite the filter with the symbol signal samples to generate an output signal which provides a further representation of the channel impulse response. A symbol time adjustment estimator is operable to adjust the symbol synch time in accordance with the adjustment provided by at least one the pilot assisted tracker and the guard adapted filter processor. The pilot assisted tracker estimates the symbol synch time from a channel impulse response estimate generated from pilot signal samples.

20 Claims, 11 Drawing Sheets

(a) Expected IFFT (b) ISI altered IFFT

APPARATUS AND ASSOCIATED METHOD OF SYMBOL TIMING RECOVERY USING COARSE AND FINE SYMBOL TIME ACQUISITION

FIELD OF INVENTION

The present invention relates to receivers that are operable to detect and recover data from received signal samples. The present invention also relates to methods of detecting and recovering data from received signal samples.

BACKGROUND OF INVENTION

Generally data is communicated using radio signals by modulating the data onto the radio signals in some way, and transmitting the radio signals to a receiver. At the receiver, the radio signals are detected and the data recovered from the received radio signals. Typically this is performed digitally, so that at the receiver, the detected radio signals are down converted to a base band representation and converted from analogue form to digital form. In the digital form the base band signals are processed to recover the data. However in order to recover the data, the receiver must be synchronised to the received digital signal samples to the effect that the relative temporal position of the recovered data symbols corresponds with the temporal position of the data when transmitted. This is particularly, but not exclusively true for radio communications systems in which the data is transmitted as bursts or packets of data.

An example of a radio communications system in which data is communicated in bursts or blocks of data is the Digital Video Broadcasting (DVB) system. The DVB system utilises a modulation scheme known as Coded Orthogonal Frequency Division Multiplexing (COFDM) which can be generally described as providing K narrow band carriers (where K is an integer) and modulating the data in parallel, each carrier communicating a Quadrature Amplitude Modulated (QAM) symbol. Since the data is communicated in parallel on the carriers, the same symbol may be communicated on each carrier for an extended period. Generally, this period is arranged to be greater than a coherence time of the radio channel. By averaging over the extended period, the data symbol modulated onto each carrier may be recovered in spite of time and frequency selective fading effects which typically occur on radio channels.

To facilitate detection and recovery of the data at the receiver, the QAM data symbols are modulated onto each of the parallel carriers contemporaneously, so that in combination the modulated carriers form a COFDM symbol. The COFDM symbol therefore comprises a plurality of carriers each of which has been modulated contemporaneously with different QAM data symbols.

In the time domain, each COFDM symbol is separated by a guard period which is formed by repeating data bearing samples of the COFDM symbol. Therefore, at a receiver, to detect and recover the data, the receiver should be synchronised to each COFDM symbol. The data is recovered from the COFDM symbol by performing a Discrete or Fast Fourier Transform on the data bearing signal samples of the COFDM symbol. It is therefore necessary to identify a symbol synch time after which for example, the signal samples are assumed to correspond to the data bearing signal samples of the COFDM symbol.

A previously proposed technique for acquiring synchronisation with the data bearing signal samples of a COFDM symbol is to cross correlate two samples which are temporally separated by the period over which the data bearing samples are modulated. A relative temporal position of the two samples is then shifted within the COFDM symbol, until a position is found at which the cross-correlation produces maximum energy.

Although the previously proposed synchronisation technique works adequately in the presence of additive white gaussian noise, in some situations such as where the signal is received in the presence of multi-path propagation, this technique produces a sub-optimum synchronisation point. A sub-optimum synchronisation point can cause the data bearing signal samples to be corrupted with energy from adjacent signal samples. This is known as inter-symbol interference (ISI).

SUMMARY OF INVENTION

It is an object of the present invention to provide a receiver with an improved synchronisation facility. Embodiments of the present invention can provide a receiver with an improved facility for synchronisation from which a likelihood of correctly recovering data from the received signal is increased. Various aspects and features of the present invention are defined in the appended claims.

According to the present invention there is provided a receiver for determining a synch time for recovering data from a signal samples, the signal samples including a portion corresponding to a guard period which carries data repeated from a data bearing portion of said signal samples. The receiver comprises a pilot assisted tracker which is operable to determine an adjustment to the synch time from a pilot assisted channel impulse response estimate. A guard adapted filter processor comprises a filter and a filter controller. The controller is operable to adapt the impulse response of the filter to the signal samples from the guard period, to excite the filter with the signal samples to generate an output signal, which provides a further representation of the channel impulse response. A timing adjustment estimator is operable to adjust the synch time in accordance with the adjustment provided by at least one of the pilot assisted tracker and the guard adapted filter processor.

Receivers embodying the present invention provide an improved estimate of the synch time by combining a pilot assisted tracker with a guard adapted filter processor. The pilot assisted tracker estimates the synch time from a channel impulse response estimate generated from pilot signal samples. However as will be explained, an ambiguity exists in a relative time of arrival of signal paths of the channel impulse response with respect to the main signal path. As such, there is a disadvantage in using the pilot assisted channel impulse response alone.

The term pilot signal samples as used herein refers to and includes any signal generated in time, frequency, code or other domains which is known to the receiver. For a COFDM symbol generated in accordance with the DVB-T standard, the pilot signal samples are generated from dedicated pilot carrier frequency signals. However in other embodiments the pilot signal samples may be generated from known data symbols communicated with the data bearing signal samples.

Co-pending UK patent applications serial numbers 0027423.3 and 0027424.1 (referred to in the following description as [1]) disclose a receiver having a guard adapted filter processor. The guard adapted filter processor generates a synch time estimate by matching the taps of a filter to the signal samples of the guard period. By exciting the filter with the signal samples, an output signal is produced which represents the channel impulse response. A synch time detector determines the synch time estimate with respect to the earliest of the signal paths of the impulse response. However, as will be explained shortly, in order to set the taps of the matched filter to the signal samples of the guard period it is necessary to have a first estimate of the synch time. Errors in this estimate will result in a reduction of the signal to noise ratio of the representation of the channel impulse response produced at the output of the matched filter. Correspondingly, a reduction in the likelihood of estimating the optimum synch time estimate may result. However, using the pilot assisted tracker to determine accurately the time of arrival of the main signal path provides an improved likelihood of identifying the signal samples of the guard period. Correspondingly, the signal to noise ratio of the output signal from the guard adapted matched filter results in an improvement in the estimate of the synch time with respect to the earliest signal path of the received signal samples.

The guard adapted filter processor may be referred to in the following description and claims as a matched filter processor or matched filter. However it will be understood that this term includes all types of filter having an impulse response which can be adapted to a desired characteristic. It will be understood that literal and mathematical interpretation is not implied.

In another embodiment the pilot assisted tracker is used to confirm an amount of adjustment indicated by the guard adapted matched filter processor. For example, if the amount of adjustment which is indicated by the guard adapted filter processor exceeds a predetermined maximum, the timing adjustment estimator sets the adjustment of the synch time to this predetermined maximum. The timing adjustment estimator then uses the adjustment to the synch time generated by the pilot assisted tracker, until the adjustment from the guard adapted filter processor is once again less than the predetermined maximum.

Various further aspects and features of the present invention are defined in the appended claims.

BRIEF DESCRIPTION OF THE DRAWINGS

One embodiment of the present invention will now be described by way of example only with reference to the accompanying drawings wherein.

DESCRIPTION OF PREFERRED EMBODIMENTS

1. Example Application: OFDM

An example embodiment of the present invention will now be described with reference to detecting and recovering data from a COFDM symbol produced for example in accordance with the Digital Video Broadcasting (DVB) standard. The DVB standard is disclosed in a publication by the European telecommunications standards institute number EN300744 version 1.1.2 (1997–08) and entitled "Digital Video Broadcasting (DVB); Frame Structure Channel Coding And Modulation For Digital Terrestrial Television".

Figure 1:
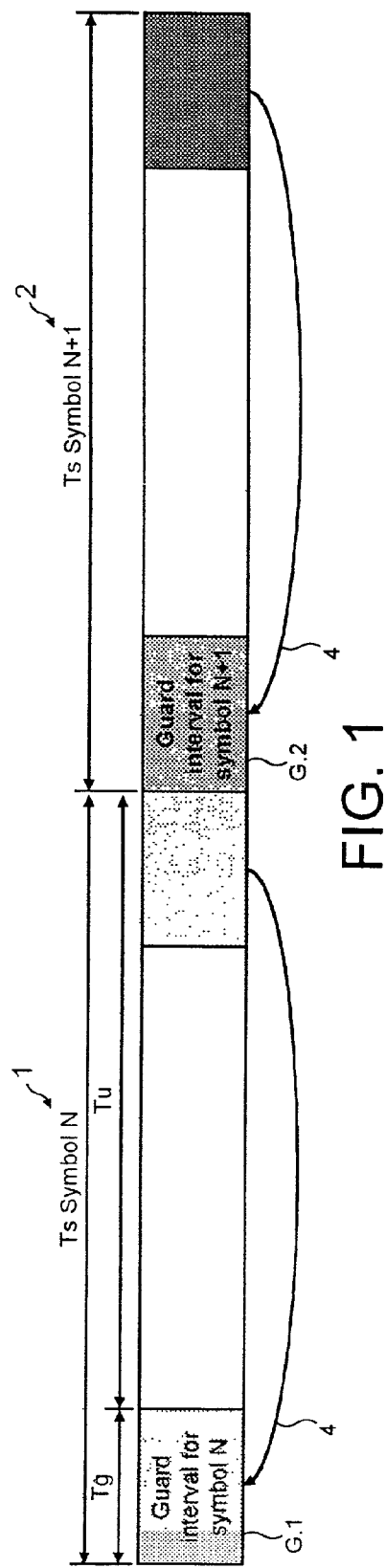
FIG. 1 is a schematic representation of two successive COFDM symbols.

As already explained, a COFDM symbol which is modulated in accordance with DVB standard is generated by modulating K narrow band carriers in parallel with the data to be communicated. Generally as disclosed in the above referenced ETSI publication, the COFDM symbols are formed in the frequency domain and then converted in the time domain using an Inverse Fourier Transform. A diagram representing the form of the COFDM symbols is shown in FIG. 1. In the following description, symbols, which are used to represent various quantities, are summarised in the following table:

| | |
|---|---|
| $T_u$ | Useful symbol duration in seconds |
| $T_g$ | Guard interval duration in seconds |
| $T_s$ | Total symbol duration in seconds |
| $N_u$ | Number of samples in useful part of symbol |
| $N_g$ | Number of samples in guard interval of symbol |
| $N_s$ | Number of samples in whole symbol |
| $N_{fs}$ | Number of symbols averaged at output of matched filter |
| $N_t$ | Number of symbols averaged at matched filter for symbol tracking |
| SST | Symbol Synch Time |
| CSST | Current Symbol Synch Time |
| MF | Guard-adapted matched filter |
| CIR | Channel Impulse Response |

In FIG. 1 two COFDM symbols represented as blocks 1, 2 are shown as they would be transmitted by a DVB transmitter with time progressing from left to right across the page. As shown in FIG. 1, each COFDM symbol 1, 2 has a useful part of the symbol during which the data is transmitted. This part of the symbol has duration of $T_u$ seconds and has $N_u$ samples. A guard interval G.1, G.2 of duration $T_g$ seconds separates the current symbol from the previous one. The guard interval has $N_g$ samples. For each symbol 1, 2 the guard interval G.1, G.2 therefore precedes the useful part of the symbol and is formed, as indicated by an arrow 4, by replicating the samples in the last $T_g$ seconds of the useful part of the symbol. Each COFDM symbol of $N_s$ samples therefore has duration $T_s=T_g+T_u$ seconds.

In order to recover the data within the COFDM symbols, the receiver must detect the data bearing signal samples from within the set of received signal samples corresponding to each COFDM symbol. Symbol acquisition entails the location of the optimum point at which the window for FFT processing should start. The FFT forms the core of the COFDM demodulator.

The replicated samples during the guard interval G.1, G.2 can be used to locate the start of each symbol at the receiver. This is what is referred to above as the location of the FFT window since the FFT must be performed over a segment of duration $T_u$ that preferably covers only the useful part of the symbol. However, FFT windows that start elsewhere within the guard interval can also be tolerated. Such FFT windows result in a phase slope at the output of the FFT that can be corrected if the FFT window location is to within $T_g$ seconds before the correct location. If however the window location error is excessive, the resultant phase slope wraps around $\pm\pi/2$ radians and so cannot be resolved and corrected. This results in inter-symbol interference (ISI) which degrades the receiver performance.

2. Receiver

Figure 2:
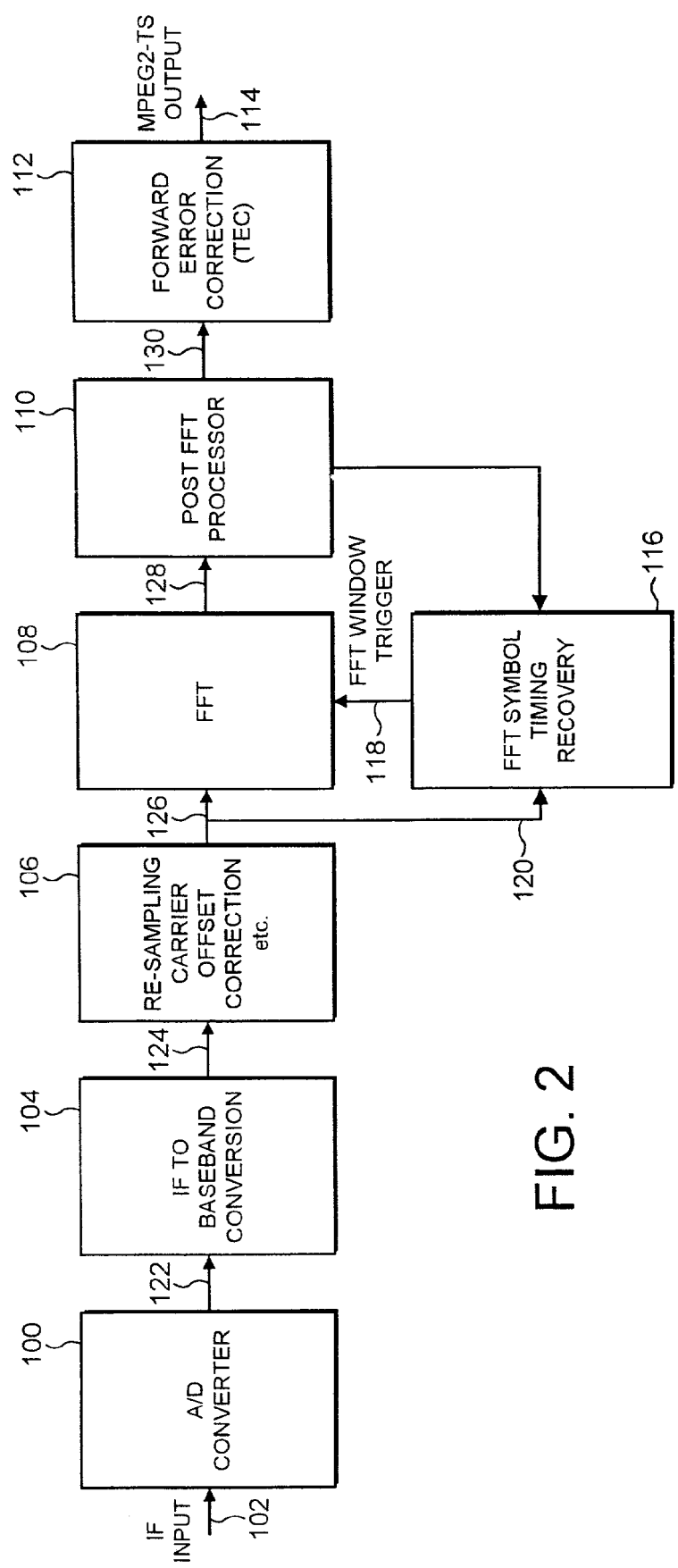
FIG. 2 is a schematic block diagram of a receiver according to an embodiment of the present invention.

A receiver for detecting and recovering data from for example a COFDM symbol is shown in FIG. 2. In FIG. 2 an analogue to digital converter 100 is arranged to receive an intermediate frequency (IF) signal representing the detected radio signal on which the COFDM symbol has been modulated. The receiver also includes down conversion means and detection means in order to convert the radio frequency signal into an intermediate frequency signal which is fed to the analogue to digital converter 100 via an input 102. Thus it will be appreciated that the receiver may also include radio frequency receiving and down converting means which are not shown in FIG. 2. After being analogue to digitally converted the received signal is processed by an intermediate frequency to base band conversion means 104 before being processed by a re-sampling and carrier offset correction processor 106. The re-sampling and carrier offset correction processor 106 is arranged to track in the frequency domain the K carriers of the COFDM modulation. The base band received signal samples are then fed to a Fast Fourier transform processor 108 which serves to convert the time domain received signal samples into the frequency domain. The data is then recovered from the frequency domain signal samples by a post FFT processor 110. The data is then fed to a forward error correction processor 112 which operates to decode the error correction encoded data to finally produce the recovered data at an output 114.

The receiver according to this example embodiment provides a synchronisation detector, which locates the FFT window from which the data bearing signal samples are processed by the FFT processor 108. The FFT window position is adjusted in order that the window includes the maximum energy representative of the data bearing signal samples. To this end an FFT symbol timing recovery processor 116 is arranged to generate a signal indicative of a symbol sync time which is fed to the FFT processor 108 via a connecting channel 118. The FFT symbol timing recovery processor 116 is arranged to detect the symbol sync time from the received set of signal samples which represent each COFDM symbol. These are received from the re-sampling and carrier offset correction processor 106 via a connecting channel 120.

3. Explanation of Technical Problem

In [1] a detailed explanation of the receiver of FIG. 2 is provided. In particular a guard adapted matched filter processor is disclosed which is operable to detect and track a substantially optimum Symbol Sync Time (SST) for recovering the data from the COFDM symbol.

Receivers embodying the present invention provide a further improvement in generating and maintaining the SST for recovering the data from the COFDM symbol. A result of this improvement is to reduce the bit error rate in the recovered data. This is achieved by more accurately determining an optimum SST in the presence of inter-symbol interference. The receiver embodying the present invention utilises a Pilot Assisted Channel Impulse Response (CIR) estimation in order to identify the SST. The receiver combines an estimate of the Time of Arrival (TOA) of the main path provided by the pilot assisted CIR estimate, with the SST estimate formed by the guard adapted matched filter processor disclosed in [1]. However, why not utilise the pilot assisted CIR estimate alone in order to maintain the optimum SST? The rest of this section provides an explanation of the technical problem faced by the guard-adapted matched filter which is employed in symbol time tracking by receivers embodying the present invention. Section 4 describes the pilot assisted CIR estimator and explains why it alone is not sufficient to identify and track the optimum SST.

The method for providing a SST estimate and tracking of the SST presented in [1] was simplified in order to allow an economic implementation. A full implementation would require a bank of $2N_g+1$ matched filters with the taps of each filter offset by one sample from the taps of the previous filter. A representation of the channel impulse response would then be formed by summation of all filter outputs, suitably delayed. Post-processing of the summed output from all the banks similar to the post-processing detailed in [1] would be used to extract an accurate time of arrival (TOA) of the earliest arriving propagation path. This time is also the desired optimum SST for the given symbol. From the SST, the start of the FFT window for the current symbol can then be derived.

An implementation of this would require a bank of $2N_g+1$ correlators followed by a bank of $2N_g+1$ moving average (MA) filters, each MA filter incorporating a delay buffer of $N_g$ complex samples. This implementation, for the 8K mode in which $N_g$ could be as much as 2048 samples, would be prohibitively expensive in gates and power. Accordingly the receiver proposed in [1] was therefore simplified to allow operation in two stages: a coarse acquisition stage that provided the nominal start of the OFDM symbol of the dominant propagation path. This was then followed by a fine acquisition stage in which the TOAs for all other echo paths present (relative to the coarse symbol time) are determined. The final acquired SST only changed from the coarse time if the fine acquisition revealed the presence of pre-cursive echoes, in which case, the SST would be moved back to the relative TOA of the earliest arriving significant echo. In this way, the fine acquisition only needed to employ one complex matched filter.

The accuracy of the SST so acquired however, depends on the coarse acquisition stage. The criterion used by the coarse acquisition stage to determine the SST is principally the occurrence time of the accumulated correlator energy over the duration of one guard interval. Whilst in a single path channel this can be very accurate, the presence of echoes on the channel often causes the occurrence time of maximum energy to be different from the actual TOA of the dominant path thereby, introducing an error in the resultant SST. This error cannot easily be determined and so is carried forward into the fine acquisition stage which in turn has no way of eliminating the error during acquisition. Furthermore, this error in the TOA of the dominant path means that the taps and excitation of the guard adapted matched filter (MF) used in fine acquisition cannot be accurately determined. This has the effect of raising the noise floor at the output of the MF. This increased noise swamps the correlation of any low powered echoes that might be present rendering them undetectable by the post-processing that follows the MF. From experience, all echoes with power higher than about −21 dB (with respect to the power of the dominant path) if not equalised would cause a BER degradation at the demodulator output. This echo level will be referred to herein as the threshold of useful equalisation since there is no noticeable performance penalty if echoes below this level are not correctly equalised. However, in employing the fine symbol acquisition stage as detailed above, the correlation at the output of the MF from echoes at these levels tends to be swamped by the noise that results from incorrect coarse symbol acquisition.

Embodiments of the present invention aim to eliminate or at least reduce this error during post-acquisition symbol tracking. Receivers embodying the present invention provide a closed loop arrangement for detecting the presence of the error and correcting for it. One way to correct the SST error is to apply pilot-assisted symbol tracking based on extracted pilot information after the FFT. This information is then fed back to the time domain so that the symbol tracker can adjust for the error.

4. Post-FFT Symbol Tracking

Each OFDM transmitted symbol includes pilot sub-carriers centred at known frequencies which can be extracted from the output of the FFT and used to estimate the transfer function H(z) of the channel. The estimated channel transfer function H(z) can be inverse transformed via an IFFT to give a representation of the time domain channel impulse response (CIR). Symbol time tracking carried out on the CIR derived from such feedback can correct any symbol time acquisition errors that arose during initial symbol acquisition.

4.1. Pilot-Assisted CIR Estimation

Figure 3:
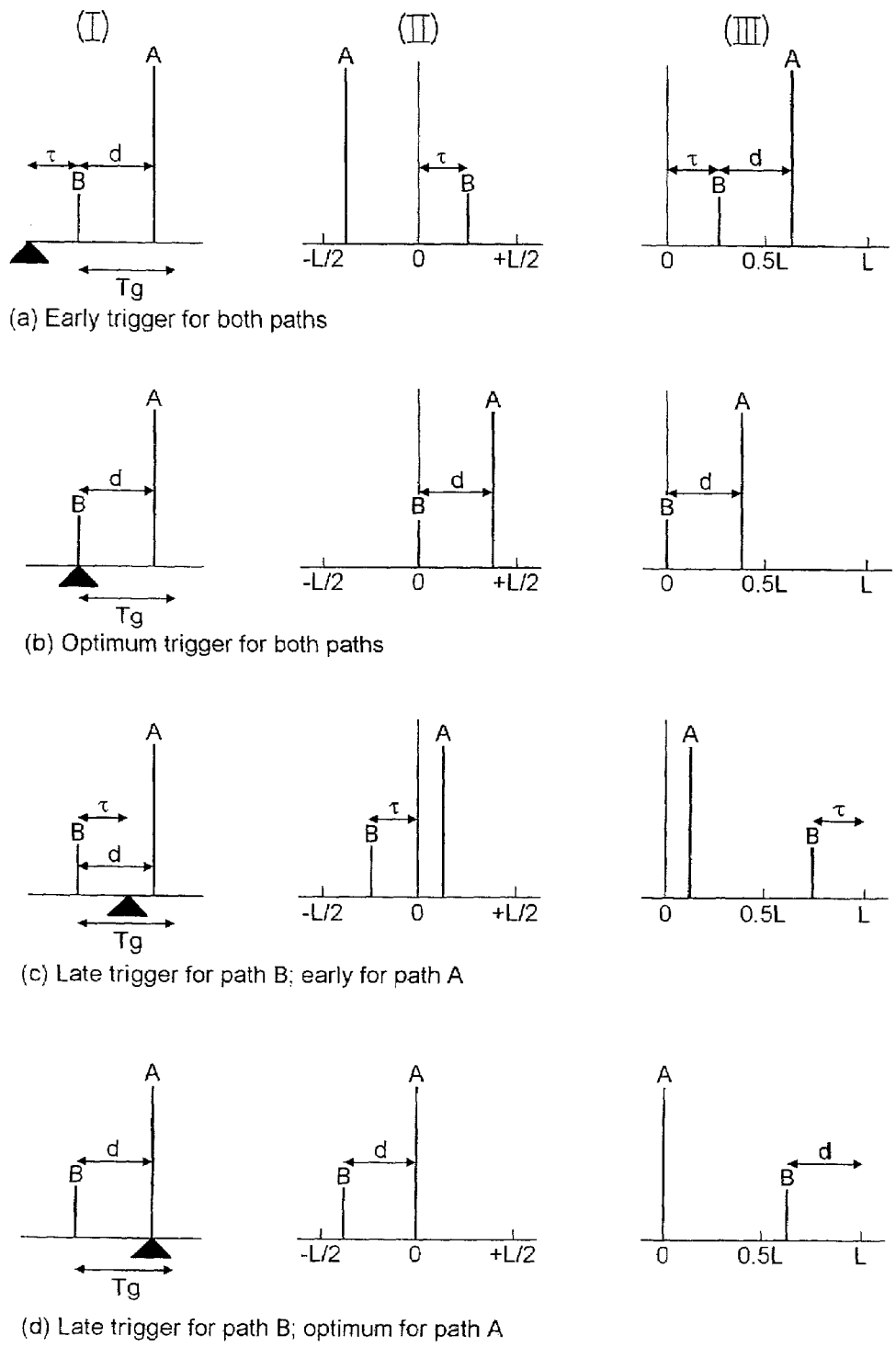
FIG. 3 provides a set of example diagrams illustrating an example pre-cursive channel impulse response as produced using a pilot assisted channel impulse response at different symbol synch times.
Figure 4:
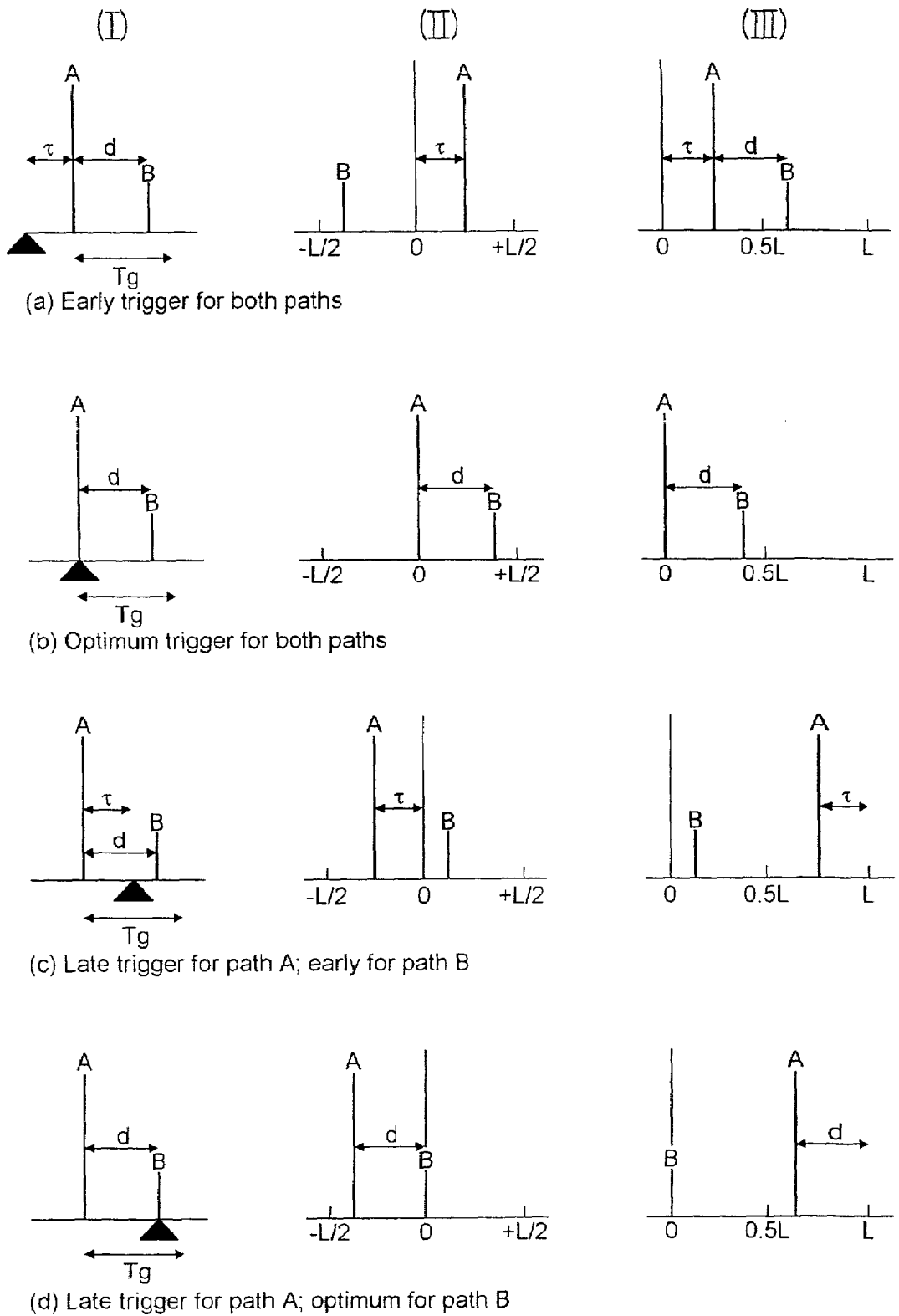
FIG. 4 provides a further example set of diagrams illustrating a post-cursive channel impulse response produced using a pilot assisted channel impulse response at various different symbol synch times.

Let the IFFT of H(z) be of length L bins. FIG. 3 illustrates the appearance of the output of the IFFT for a pre-cursive channel profile composed of a main path with power A and an echo of power B which arrives at the receiver d seconds earlier than the main path. FIG. 4 is a similar illustration for a post-cursive channel profile. Here, an echo of power B arrives at the receiver d seconds after the arrival of the main path. Each figure has three columns: (I) the first column shows the actual channel profile to be equalised and, marked on this with the shaded triangle, is the SST derived from symbol acquisition and columns (II) and (III) respectively show the double-sided and single-sided outputs from the IFFT of H(z) for an IFFT with L bins. These last two columns are not shown to scale.

To estimate the CIR and hence its start from the IFFT output, an interval of duration $T_g$ seconds is identified, which holds the highest amount of energy in the IFFT output. The start of this interval marks the start of the best estimate of the CIR and so provides the best SST from which to compute the start of the FFT window. Motivation for choosing the interval with the maximum energy is provided from a desire to concentrate equalisation effort only on those contiguous propagation paths that together maximise the energy of the received signal. Maximising the energy of the received signal within $T_g$ seconds minimises any ISI. A moving-average (MA) filter of length in bins equivalent to $N_g$ samples which slides along the IFFT output h(n) can provide the position of this interval of maximum power according to Equation (1).

$$w(n) = \left| \sum_{i=0}^{N_g} h(n+i) \right| \text{ for } n = 0, 1, \ldots L - N_g. \quad (1)$$

The index D for which w(n=D) is maximum gives the start of the interval of duration $T_g$ seconds with the maximum concentration of received signal power. In tracking, the current SST is moved (and hence the FFT window) by a number of samples proportional to the index D.

The IFFT is carried out on complex pilots and so results in a single-sided time response. A closer look at FIGS. 3 and 4 highlights a problem. Column 3 in both figures reveals that the location of path impulses with respect to bin zero in the output of the IFFT depends both on the length of the CIR and also the current SST. The effect of a wrong SST and an excessive CIR length can combine to produce a scenario much like aliasing resulting from spectral folding. Spectral folding occurs when the SST is too late with respect to the TOA of some propagation paths. At the IFFT output, the impulses due to these paths which should occur in negative time would in reality fold over to the second half of the IFFT. The aliasing problem that arises because of this can be seen by closer examination of each part of these two figures. Taking FIG. 3 first:

(a) Illustrates the effect of an early SST at the IFFT output. An early SST results in an advance of the CIR into the higher bins of the IFFT output. Whether or not path impulses occur in the second half of the IFFT output here depends both on the trigger advance τ and also the delay spread d. Since the coarse acquisition triggers on maximum energy basis, τ is likely to be quite small. In this case, the MA filter w(n) would start at zero. Optimum tracking should cause an addition of τ seconds to the SST for subsequent symbols.

(b) Illustrates the effect at the IFFT output of an optimum SST. Here path impulses would not appear in the second half of the IFFT output unless the delay spread is longer than L/2. Here again, the MA filter w(n) would start at zero and optimum tracking should result in no change to the SST for subsequent symbols. Note however that these last two profiles are similar to those of FIG. 4(c) and (d).

(c) Illustrates the effect of a late SST for the echo path which is, nevertheless, early for the main path. The late SST for the echo path causes spectral folding at the IFFT output and so results in the echo path appearing the equivalent of τ seconds before the last bin of the IFFT. Optimum tracking ought to result in a subtraction of τ seconds from the SST for subsequent symbols. For this, the MA filter w(n) ought to start at the location of the echo and then wrap round to include the main path. This can be better seen in the double-sided IFFT output. Here, the MA filter would start at τ seconds before the current SST.

(d) Illustrates an ideal SST for the main path which is however very late for the echo. Clearly, this also causes spectral folding at the IFFT output which must be treated in much the same way as in (c) above. Note that since the acquisition algorithm is always biased towards high energy paths, this particular scenario is highly likely. Also, note how these last two profiles are similar to the first two profiles of FIG. 4.

Also, note that the situations in (c) and (d) represent differences in treatment from the previous two with respect to the start of the MA filter w(n) and hence the technical problem which must be addressed. This should become more evident in the analysis of the post-cursive profile of FIG. 4:

(a) Illustrates the effect of a rather early SST on the output of the IFFT of H(z). An early SST results in an advance of the CIR into the higher bins of the IFFT output. Whether or not path impulses occur in the second half of the IFFT output here depends both on the SST advance $\tau$ and also the delay spread d. Since the coarse acquisition used here triggers on a maximum energy basis, $\tau$ is likely to be quite small. In this case, the MA filter w(n) would start at zero. Optimum tracking should cause the addition of $\tau$ seconds to the SST for subsequent symbols.

(b) Illustrates the effect at the IFFT output of an optimum SST. Here, path impulses would not appear in the second half of the IFFT unless the delay spread is longer than L/2. Here again, the MA filter w(n) would start at zero and optimum tracking should result in no change to the SST for subsequent symbols.

(c) Illustrates the effect of a late SST for the main path which is, nevertheless, early for the echo path. For the main path, a late SST causes spectral folding at the IFFT output which results in the main path appearing the equivalent of $\tau$ seconds before the last bin of the IFFT. Optimum tracking ought to result in a subtraction of $\tau$ seconds from the SST for subsequent symbols. For this, the MA filter w(n) ought to start at the location of the main path and then wrap round to include the echo. This can be more clearly visualised in the double-sided IFFT output. Here, the MA filter would start at a point equivalent to $\tau$ seconds before the current SST.

(d) Illustrates an ideal SST for the echo path which is however very late for the main path. Clearly, this also causes spectral folding at the IFFT output which must be treated in much the same way as in (c). Note that since the acquisition algorithm is always biased towards high energy paths, this particular scenario is less likely. Furthermore, acquisition to produce an SST which lies beyond the echo path would not be expected.

In summary, if the channel profiles shown in the (a) and (b) parts of both figures were guaranteed, then during tracking the correct SST adjustment could be calculated by starting the MA filter w(n) from the first bin of the IFFT. However, the channel profiles depicted in FIG. 3(*c*) & (*d*) and FIG. 4(*c*) can also be expected. As the above analysis shows, for these profiles spectral folding takes place. As such, starting the MA filter w(n) from the first bin in these cases would produce a wrong SST adjustment during tracking. Therefore embodiments of the present invention provide a facility for differentiating between the scenarios depicted in FIG. 3(*a*) & (*b*) on the one hand, and those of FIG. 4(*c*) and (*d*) on the other hand, respectively. Similarly for FIG. 3(*c*) & (*d*) on the one hand, and those of FIG. 4(*a*) and (*b*) on the other hand, respectively. Firstly however, there are some issues to be examined in order to illustrate some inventive aspects provided by receivers embodying the invention.

4.2. Size of the IFFT

Each OFDM symbol has only a limited number of pilots, this means that the size of the IFFT is in practice limited by this number. Note however that the pilots could be zero-extended to any required size thereby increasing the size of the IFFT and hence its resolution (in samples per bin) but not its accuracy (degree to which closely arriving echoes can be resolved). It is also desirable to limit the size of the IFFT so as to limit the implementation gate count. For an IFFT size of L bins, the resolution of the resultant time domain CIR would be $R=2^M/L$ samples per bin where M is 11 and 13 for 2K and 8K modes, respectively. For accurate tracking performance R should be as close to one as possible. It is however not possible to have R=1 as the pilots are decimated i.e. they are scattered amongst data bearing carriers e.g. in DVB-T scattered pilots occur on average every 12th carrier. For a decimation factor of F, the actual resolution of the CIR would therefore only be $R=2^M/L/F$ samples per bin. In an OFDM demodulator, time domain interpolation of pilot carriers across symbols within the channel estimator can be used to improve F from 12 to 3 [2]. However, since a small R implies a large L, the choice for L is thus a trade-off between resolution and gate count. In the preferred embodiment of this technique, the IFFT length L is set to 256 bins. This means that with F=3 as explained above, R is 10.66666 and 2.66666 samples per bin for 8K and 2K modes, respectively.

4.3. Effect of Aliasing

Pilot assisted closed-loop tracking utilises the IFFT of H(z). As has been indicated above, the pilot carriers that are inverse transformed to get the CIR estimate are decimated. The channel estimator can use time interpolation across symbols to reduce this decimation factor from 12 to 3. The pilot symbols at the input of the IFFT so interpolated therefore still cover only a third of the signal bandwidth. Correspondingly, when they are inverse transformed, the CIR coverage will be a maximum of $T_u/3$ seconds with an IFFT midpoint (L/2 point) at $T_u/6$ seconds. This means that for any CIR with a delay spread of longer that $T_u/6$ seconds, some path impulses would appear in the second half of the IFFT output—the aliasing region. Also, for any received path for which the SST is late i.e. the SST occurs after the beginning of such path's guard interval (as illustrated in FIGS. 3*c*&*d*; and FIGS. 4*c*&*d*), its pulsed representation would fold around DC and also fall in the second half of the IFFT output. This is indeed the classic description of aliasing which should be resolved to differentiate between long echoes and early SST prior to equalising such echo profiles. Here, aliasing exists because when an IFFT output with pulses in its second half bins occurs, an ambiguity exists. In particular it is difficult for a symbol tracker to determine whether these pulses should be in the first or second half of the CIR. This is because the CIR may have a long delay spread or the current SST may have occurred too late for some echo paths. Such ambiguity can be expected if any of the following occurs:

(a) An ideal SST is used but the delay spread d is longer than $T_u/6$ seconds.

(b) The delay spread d is less than $T_u/6$ seconds but the current SST is $\tau$ seconds too early such that $\tau+d>T_u/6$ seconds.

(c) Irrespective of the delay spread, the current SST is $\tau$ seconds too late for an early arriving echo forcing it to fold around to a bin of $T_u/3-\tau$ seconds at the IFFT output.

(d) Theoretically, it is possible to equalise all channel profiles with delay spreads less than or equal to the guard interval. If however, for the example embodiment the OFDM symbol has a guard interval of Tu/4 seconds, then since $T_u/4>T_u/6$, even with an ideal current SST, only echoes shorter than $T_u/6$ seconds will not cause aliasing for this guard interval.

Note that in the last case, even a CIR with delay spread of $T_u/6$ seconds would not alias only if the current SST computed at symbol acquisition is exactly right. In practice, the accuracy of symbol acquisition is limited meaning that the absence of aliasing is only achievable for really short delay spreads with accurate or moderate early acquisition for a guard interval of Tu/4 seconds. It is therefore imperative to find a method for resolving such aliases during tracking.

In [1], the manner in which the matched filter symbol acquisition can be used to extract the relative offset in time of arrival (TOA) between the main echo and any other echoes that make up a given channel profile was detailed. It has further been explained above that the use of this approach for tracking raises two problems:

1. There can be an error in determination of the TOA of the main echo itself—by the coarse symbol acquisition stage. Therefore, whilst the relative offsets of all the other echoes from the main echo derived from processing of the matched filter output are reasonably accurate, the actual TOA of each echo in the CIR is biased by the original error in the TOA of the main echo. A consequence of this error bias is to raise the noise floor at the output of the matched filter.
2. The raised noise floor swamps the correlation from low power echoes making them difficult to detect and equalise correctly. When such echoes have power above the threshold of useful equalisation, incorrect equalisation results in a BER degradation at the demodulator output.

A solution to both these problems is to increase the accuracy of the TOA of the main path prior to running the matched filter.

As explained above, a post-FFT pilot assisted CIR is generated from an IFFT transform of the pilot carriers extracted by the channel corrector. The FFT is an excellent noise filter and so has potential of providing an accurate CIR though with a rather coarse resolution. During tracking, the actual CIR and hence the trigger adjustment can be computed by use of the MA filter w(n) to locate the maximum energy concentration of echoes within $T_g$ seconds duration. As explained with reference to the illustrations of FIG. 3 and FIG. 4, this approach suffers from a problem. At the IFFT output, spectral folding which results if the current SST is later than the arrival time of some echoes can be confused with long echoes. This produces an ambiguity that must be resolved to determine the start bin for the MA filter w(n). This is a weakness which diminishes the usefulness of this approach in single frequency networks (SFN) which generally operate with guard intervals of $T_u/4$ seconds and suffer from a preponderance of long echoes.

Embodiments of the present invention exploit the complementary nature of these two approaches to provide an improved closed-loop pilot assisted symbol tracker. On the one hand, the pilot assisted tracker can accurately determine the TOA of the main path as required for optimal performance of the matched-filter tracker. On the other hand, the matched-filter tracker is capable of detecting the relative TOAs of all other echo paths present and so can resolve the aliasing that the pilot assisted tracker (PAT) suffers from. The SST tracker operates in two stages which are explained below.

4.4. Determination of Main Path TOA Using the Pilot Assisted Tracker

When receivers embodying the present invention first enter the tracking stage, a first task is to locate the TOA of the main path with respect to the current symbol synch time (CSST). To do this, a Pilot Assisted Tracker (PAT) is used. Referring to FIG. 3 and FIG. 4, symbol acquisition operates in a manner so as to force the CSST for the profiles in these figures to lie between the main path A and the echo path B. In normal operation, it can be expected that the IFFT output should produce profiles such as (b), (c) and (d) but not (a). To calculate the main path TOA from the CSST, an adjustment must be calculated which when added to the CSST would yield the correct main path TOA. First, the main path is located, which corresponds to the IFFT bin of maximum energy. The number of this maximum energy bin is found and then it is determined whether the CSST needs to be advanced or retarded in order to get to this maximum energy bin for an optimised SST.

A bin as used in the following description is a group of samples R which define the discrete time domain values formed by the IFFT.

Taking FIG. 3(c) for example, the adjustment to the CSST would be $(d-\tau)$ seconds. This is calculated by subtracting the CSST (which is zero at start of tracking) from the bin number of the maximum energy path. In this case, the adjustment is positive i.e. for subsequent symbols the SST would increase by this adjustment. Taking FIG. 4(c) for example, the adjustment to the CSST would be $-\tau$ seconds. In this case, the adjustment is negative i.e. for subsequent symbols the SST would decrease by $\tau$ seconds. Clearly, spectral folding has occurred here so the adjustment cannot be calculated in a similar manner as the case outlined for FIG. 3(c). To explain the operation of receivers embodying the present invention which differentiate these cases of spectral folding from the normal cases, the operation of the receiver for determining the coarse symbol start time will now be explained.

As explained in [1], the coarse symbol time acquisition algorithm works by maximising the accumulated correlation between the guard interval and its copy at the end of the symbol. The accumulated correlation is measured by means of a MA filter of length $N_g$ samples. It can be demonstrated that in a two path channel, the peak output of this filter, the position of which provides the SST would occur when the filter straddles both echoes. This means that the CSST always falls somewhere within the CIR span. Thus for example, in a two-path channel profile with equal strength paths, the CSST would fall midway between the two paths. In the case where one of the paths is of significantly higher power than the other, the CSST would drift closer to the higher power path but always lie between the two paths. This explanation can be similarly applied to channels with more than two paths. In post-cursive channels the CSST is therefore always either optimum or late for the main path. As in FIG. 4(c), assume that this CSST is $\tau$ seconds late with respect to the optimum TOA of the main path. Then when viewed at the output of the IFFT, this path folds over and appears the equivalent of $\tau$ seconds before the last bin of the IFFT. Such spectral folding can be detected by determining whether the maximum energy path lies before or beyond the L/2-th bin. If it lies before, then the adjustment to the CSST to get the TOA of the main path is positive. Otherwise, the adjustment must be negative. To calculate this adjustment in this case, let the bin number of the maximum energy path be m then, the adjustment is (m−L+1) bin equivalents in seconds.

Clearly, as long as $\tau < l/2$ where l is the equivalent of L bins in seconds, the ambiguity caused by spectral folding in calculating the adjustment to the CSST to get the TOA of the main path has been eliminated. As discussed above, the worst case occurs on a two-path channel with equal signal strength for each path when $\tau = d/2$. If it is sufficient to equalise only channel profiles with delay spreads shorter than or equal to the guard interval, then this holds even for the longest guard when $T_g=T_u/4$ giving $\tau \le T_u/8$ seconds. As this is less than the $T_u/6$ seconds (equivalent to L/2 bins) the spectral folding can be resolved in this manner. Therefore, under normal circumstances, the determination of an optimum CSST adjustment to get to the TOA of the main path can be expected to operate correctly. However simulations showed an additional problem which will be explained in the following section accompanied by the solution that was devised.

4.5. The Impact of ISI

Figure 5:
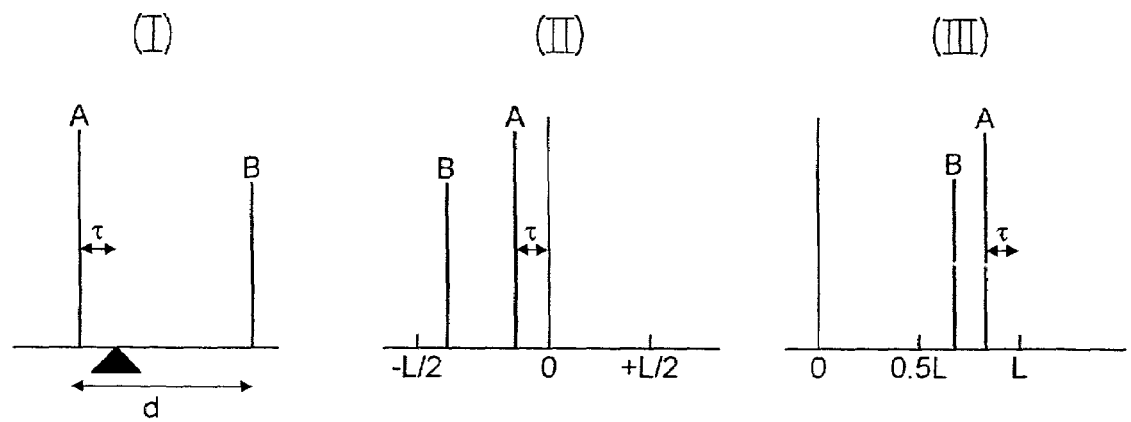
FIG. 5 provides a further set of diagrams illustrating an example channel impulse response produced using a pilot assisted channel impulse response in the presence of excessive inter symbol interference.
Figure 5:
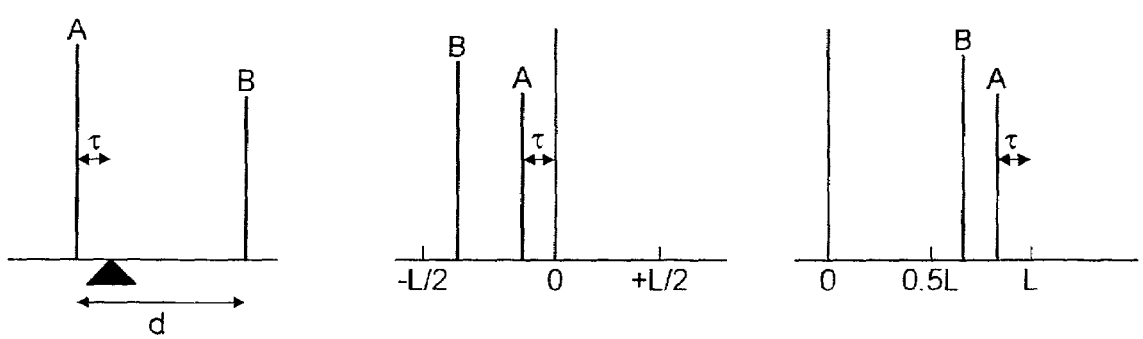

Imagine a post-cursive profile such as in FIG. 5. Further imagine that the power of the echo path is only slightly less than that of the main path e.g. A−B<3 dB. Then according to the analysis of coarse acquisition performance given above, the CSST would be closer to the main path as illustrated in FIG. 5(a). Also, according to the analysis above, and given the CSST assumed here, the IFFT output profiles given in FIG. 5(a) columns (II) and (III) would be expected. Under certain conditions highly dependent on the delay spread d, an IFFT profile such as that given in FIG. 5(b) might be observed. In this strange profile, the main path A has emerged at the IFFT output with lower power than the echo path. The spectral folding resolving algorithm given above, would therefore detect path B as being the main path. Furthermore, since path B is located in the second half of the IFFT output, it would effect a CSST adjustment of −(l−d+τ+1) seconds i.e. for subsequent symbols, it would pull back the SST by this adjustment. Clearly, this would be wrong on two counts:

1. The wrong path has been detected as the main path. This of itself is not a major problem since the two paths are very close in power anyway. There might be a problem if this incorrect main path ultimately dies away—but the effect of this can be sorted out elsewhere. For now however, the important thing is that the MF tracker would not be seriously affected as the paths are close in power.
2. The more serious problem is the wrong determination of the TOA of the path concerned. Observing column (I)of FIG. 5, the CSST is late for path A but early for path B. Therefore, to get the TOA of path B from the CSST an adjustment of (d−τ) seconds should be added to the CSST, i.e. move the CSST forward not pull it back.

This problem arises for the following reason. The late CSST for path A results in ISI during equalisation of path A. Depending on the delay spread d the deep frequency nulls that appear on the channel as a result of the multi-path propagation null out a certain combination of pilots which coupled with the impact of ISI on the dominant path has the effect of reducing the power of the main path at the output of the IFFT. To solve this problem, receivers embodying the present invention detect when this false spectral folding has occurred and then move the CSST forward instead of backwards. The receivers operate as described in the following paragraphs, and also represented by the flow diagram in FIG. 10.

When spectral folding is detected, where the bin of maximum energy is located in the second half of the IFFT output, the energy in all the bins starting from just after the maximum energy bin up to the last bin is calculated. This accumulated energy ($E_{acc}$) is compared with the energy of the maximum energy bin. If the two are very close, or the accumulated energy exceeds that of the maximum energy bin, false spectral folding is declared and the CSST is moved forward instead of backward as the basic algorithm would do. The rationale here is that false SST is only generated when the combined echo energy before the CSST is very close to that after the CSST. Furthermore, this only happens if the CSST is sufficiently close to the main path itself so that the time between the CSST and the TOA of the echo path is greater than l/2 seconds. Note that false spectral folding only occurs in a post-cursive channel profile and the scheme outlined here to counter it effectively changes the view of the channel profile into a pre-cursive one.

4.6. Determination of the TOA of Other Paths

Once the TOA of the main path has been determined (strictly speaking, only to within ±R samples as explained in section 4.2) a guard adapted matched filter processor disclosed in [1] can be used to track an optimum SST. With a more accurate TOA, the noise floor should be low enough not to swamp any low power echoes that might be present. At the end of the MF output averaging process any adjustments needed to the CSST are determined in further processing as explained in [1]. In practice, this adjustment is very little in post-cursive channels, unless false spectral folding is detected in which case the channel is treated as pre-cursive. In pre-cursive channels however, since the demodulator is currently locked onto the main path, the CSST needs to be adjusted so that the SST becomes early for subsequent symbols to take account of the paths that arrive earlier than the main path. The guard adapted matched filter processor, by analysing the TOAs of other paths, also determines the CIR delay spread which as was indicated in [1] is needed within the channel corrector. Any adjustment to the CSST calculated by the guard adapted matched filter processor is treated in one of three ways as described below.

4.7. The Effect of IFFT Resolution

The issue of the resolution R (in samples per bin) of the IFFT output was discussed in section 4.2. This means that any adjustments to the CSST derived from the PAT is only accurate to within ±R samples. For this reason, for both the PAT and the guard adapted matched filter processor a jitter threshold is set in samples of ⌈R⌉ i.e. integer just greater than or equal to R . If the guard adapted matched filter processor returns a required adjustment whose absolute value lies within this threshold value, then the CSST is simply adjusted accordingly. Adjustments greater than this threshold need to be further checked for the reasons explained below. Recall that from the choices detailed in section 4.2 R is 2.6667 and 10.6667 for 2K and 8K modes, respectively. Accordingly therefore, the jitter thresholds for these modes are 3 and 11, respectively.

4.8. The Effect of Noise and Ghost Echoes

In [1], a ghost echo cancellation and noise elimination strategy was described as part of the post-processing needed at the output of the matched filter. Unfortunately since the TOA of the main path can only be accurate to within ±R samples, these processes occasionally leave remnants of cancelled ghost echoes and/or noise that if left unchecked would force a spurious adjustment to the SST during tracking. To guard against this, when the MF tracker returns a non-zero adjustment to the SST whose absolute value is greater than the jitter threshold which is set to ⌈R⌉, such adjustments first have to be checked to make sure that they are not due to noise or non-complete cancellation of ghost echoes. To do this test, the PAT is invoked in trial adjustment mode. In this mode, the bin from which the guard adapted filter processor starts to process the output of the IFFT (see section 5.0) is adjusted so as to incorporate the effect of changing the CSST by the trial adjustment. If the new adjustment returned by the PAT lies within the jitter threshold (the trial adjustment having been already taken into account), then an adjustment to the SST equal to the trial adjustment is effected otherwise, the adjustment is disallowed. After this, the guard adapted matched filter processor is invoked and used thereafter to track the SST.

4.9. Guarding against FFT Buffer Overflow

In order to minimise RAM use, the buffer that holds the samples for FFT processing is only $N_u$ locations long. This means that excessive adjustments to the SST might either result in loss of symbol samples through buffer overflow (for excessive negative adjustments) or buffer underflow (for excessive positive adjustments). Accordingly, there's a threshold of maximum adjustment ($D_{max}$) during one OFDM symbol against which all adjustments must be tested. For any adjustment $D > D_{max}$, only $D_{max}$ samples of adjustment to the SST are allowed. The residue ($D - D_{max}$) must be held and applied during the next tracking period. Since the guard adapted matched filter processor cannot accurately operate with only a partially adjusted SST, PAT is invoked for this task. Recall that due to the need to check large adjustments, all significant SST adjustments are only ever effected by the PAT anyway. If any such adjustment produces a residue, the PAT is also used in the next tracking period. The PAT is used for subsequent tracking periods until it effects an adjustment within the jitter threshold. Only after this can the guard adapted matched filter processor be used for subsequent tracking periods.

5. Receiver Architecture

Figure 6A:
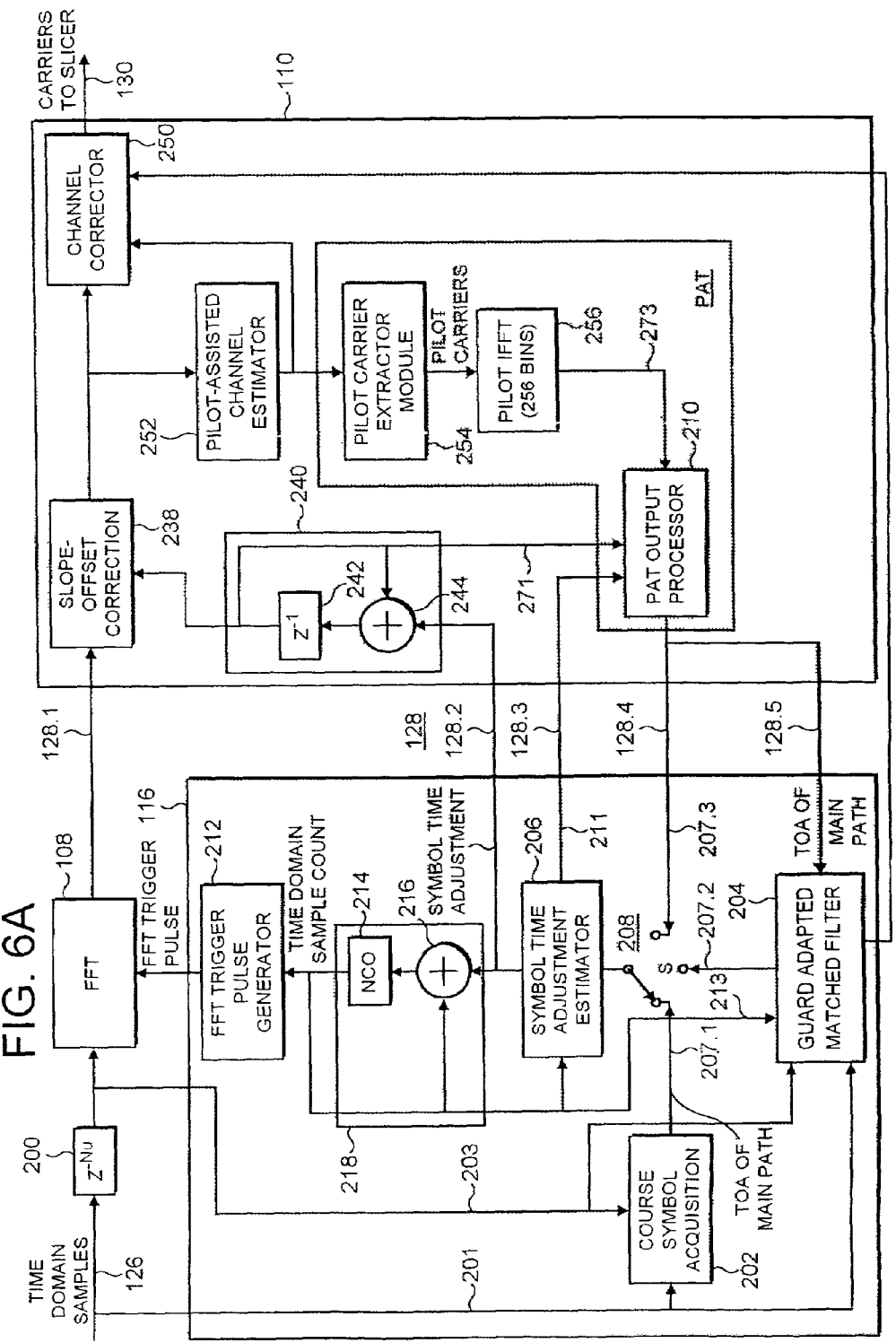
FIG. 6A is a schematic block diagram of an FFT symbol timing recovery processor and a post FFT processor which form part of the receiver of FIG. 1.
Figure 6B:
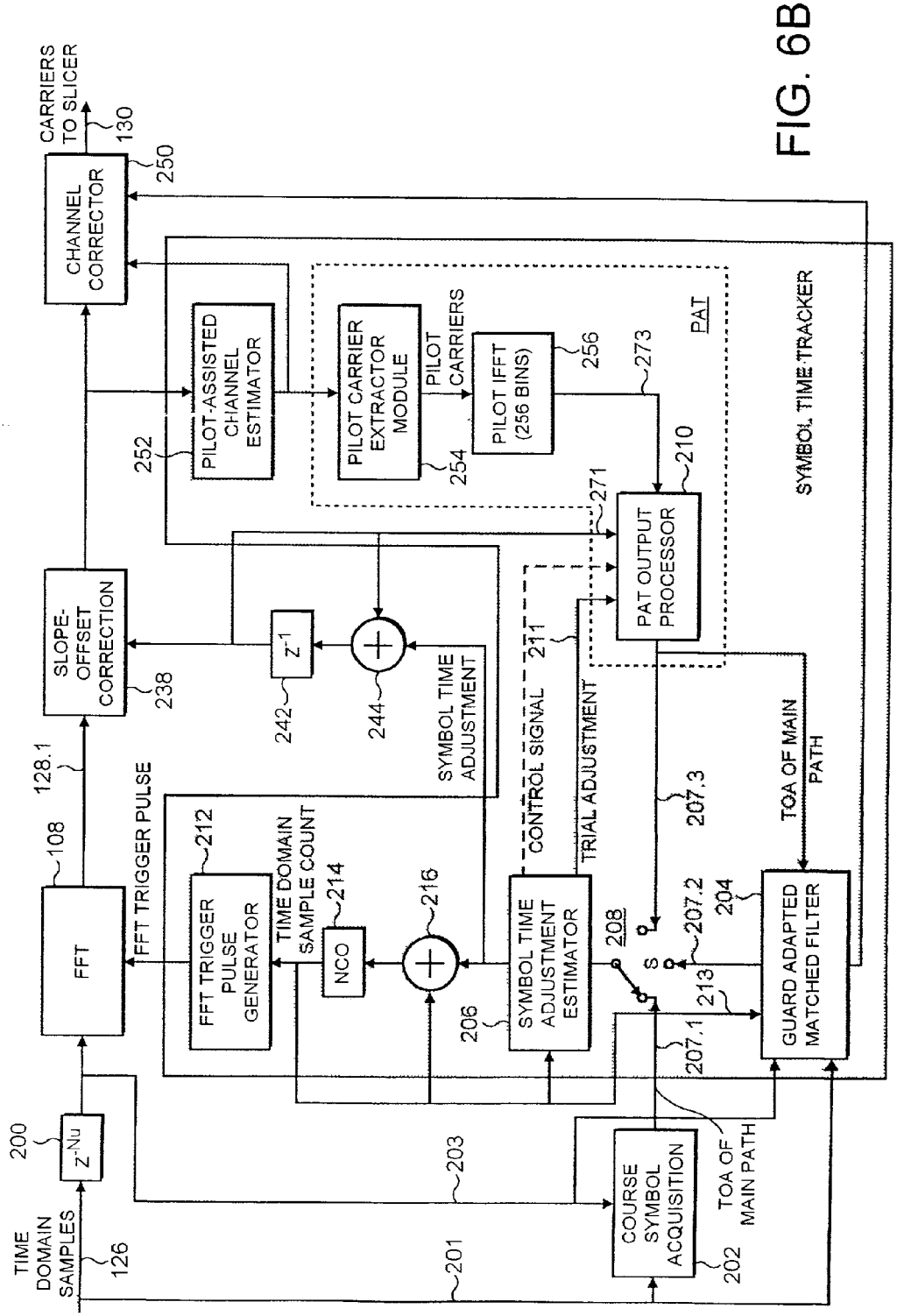
FIG. 6B is a schematic block diagram of the FFT symbol timing recovery processor and the post FFT processor shown in FIG. 6B, showing parts which form a Symbol Time Tracker.

The FFT symbol-timing recovery processor 116 and the post-FFT processor 110 are shown in more detail in FIGS. 6A and 6B. The FFT symbol-timing recovery processor 116 and the post-FFT processor 110 in combination provide a symbol timing recovery process which implements a solution to the SST tracking problem according to an embodiment of the present invention. The symbol time recovery process is performed by a Symbol Time Tracker which is shown in FIG. 6B as being formed from parts of the FFT symbol-timing recovery processor 116 and the Post FFT processor 110.

In FIG. 6A and B (referred to in the following paragraphs as FIG. 6), the time domain samples representing the COFDM symbol are received at a delay unit 200. After being delayed by $N_U$ samples, the time domain samples are fed to the FFT processor 108. The FFT processor 108 converts the time domain samples into the frequency domain. The frequency domain samples are then fed to the post-FFT processor 110. The time domain samples received from the channel 126 are also fed to a coarse symbol acquisition processor 202 and guard adapted matched filter processor 204. The delayed samples from the output $N_U$ delay unit 200 are also fed to a second input of the coarse symbol acquisition processor 202 and the guard adapted filter 204.

Also forming part of the FFT symbol-timing recovery processor 116 is a symbol time adjustment estimator 206 having an input which is selectable from one of three sources via a switch 208. The three sources are the output of the coarse symbol acquisition processor 202, an output of the guard adapted match filter 204, and an output from a Pilot Assisted Tracker (PAT). The three sources respectively feed signals to three inputs to the switch 208 on respective channels 207.1, 207.2, 207.3.

As will be explained shortly, the symbol timing adjustment estimator 206 is arranged to adjust the SST at which the FFT processor 108 performs an FFT on the received signal in order to recover data from the COFDM symbol. In order to do this, the symbol-timing recovery processor 116 is also provided with an FFT trigger pulse generator 212. The trigger pulse generator is arranged to receive a signal providing an indication of the sample count which corresponds to the symbol timing via a numerically controlled oscillator 214. SST tracking is effected by using adder 216 to add sample count adjustments from the symbol time adjustment estimator 206 into the NCO 214. This symbol count adjustments are derived by the symbol time adjustment estimator 206 based on inputs from a digital tracking loop composed of the PAT (in association with some blocks of the post-FFT processor 110) and the guard adapted matched filter 204. The digital tracking loop is therefore arranged in combination with the symbol time adjustment estimator 206 to adjust the FFT trigger point in accordance with the current SST by use of the PAT 210 (in association with some blocks of the post-FFT processor 110) and/or the guard adapted matched filter 204.

As will be explained, the symbol time adjustment estimator 206 determines the SST with respect to the CSST by selecting an adjustment value provided by either the coarse symbol acquisition processor 202, the guard adapted filter processor 204 or the PAT.

The PAT is comprised of elements 254, 256 which form the pilot assisted channel estimate and a PAT output processor 210 which processes this channel impulse response estimate. The PAT generates an adjustment to the SST from an estimate of the TOA of the main path in the channel impulse response. This is generated from a channel impulse response estimate generated from the pilot symbols as has already been explained. The channel impulse response estimate is generated by the post-FFT processor 110. The post-FFT processor 110 includes a slope offset correction processor which receives the frequency domain samples from the input channel 128.1. The slope off-set correction processor receives a second input from the output of the time adjustment estimator via a digital slope integrator 240 formed from a delay element 242 and an adder 244. The slope offset correction processor 238 is arranged to adjust the phase shift in the frequency domain signal samples in order to maintain phase continuity of the pilot carriers in the event of SST adjustments. This phase continuity is required for other blocks within the post-FFT processor. The output of the slope offset correction processor 238 is fed to a channel corrector 250 and a pilot-assisted channel estimator 252. A pilot carrier extractor module 254, and a pilot IFFT processor 256 are provided in order to generate the pilot assisted CIR. Parts of the symbol time recovery processor 116 and the post-FFT processor 110 will be explained in more detail in the following sections.

5.1. Pilot Assisted Channel Estimation

As explained above the PAT requires a pilot assisted CIR estimate in order to generate an adjustment value to the SST. The pilot assisted channel estimation is provided as part of the Post FFT processor 110. The parts, which form the pilot assisted channel estimate, are as follows:

Pilot-Assisted Channel Estimator 252 operates on the frequency domain carriers from the FFT block 108 after they have gone through the Slope-Offset Correction block 238. From amongst all the carriers, the pilot carriers are identified and extracted. There are only a limited number of pilot carriers per COFDM symbol—spaced nominally every 12 carriers. Since the amplitudes and phases of pilot carriers are known, the channel transfer function (CTF) at the respective pilot frequencies can be computed by dividing each received pilot (phase & amplitude) with its expected value. For each COFDM symbol, the channel estimator now has samples of the CTF every 12 carriers. Next the channel estimator combines these CTF estimates over a number of successive COFDM symbols. There are various ways of doing this but the general effect is that it enables the channel estimator to increase the CTF sample rate to every 3 carriers [2]. The last thing the channel estimator does is to interpolate the CTF by a factor of 3 so that a CTF estimate is provided for every data carrier. Within the Post FFT processor, these CTF estimates are sent to the Channel Corrector block 250 where they are used to equalise the effect of the channel on the data carriers. They are also sent outside of the Post FFT processor to the Pilot Assisted Tracker (PAT). The PAT is composed of the following blocks:

Pilot Carrier Extractor Module 254: The channel estimator provides CTF estimates for all carriers in the COFDM symbol. This block extracts only those CTF estimates at the pilot carriers actually, only 256 contiguous CTF estimates are extracted.

Pilot IFFT 256: This block does a 256-point inverse FFT on the 256 CTF estimates provided by the Pilot Carrier Extractor Module 254.

5.2. Pilot Assisted Tracker (PAT) Output Processor

Figure 7:
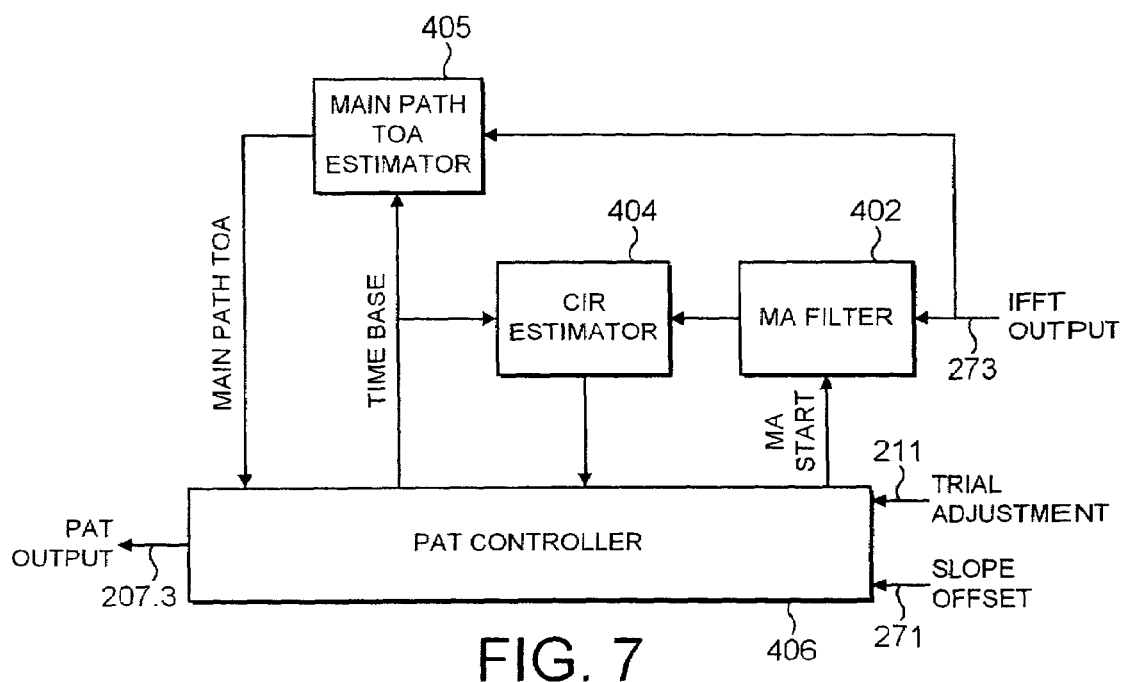
FIG. 7 is a schematic block diagram of a pilot assisted tracker which forms part of the FFT symbol timing recovery processor of FIGS. 6A and 6B.

FIG. 7 provides a block diagram of the PAT Output Processor 210 in more detail. The PAT Output Processor is comprised of the following processing blocks:

Moving Averaging (MA) Filter 402: This block estimates the time domain impulse response of the channel from the Pilot IFFT output signal. This block has a second input from the PAT controller 406 which indicates the bin of the IFFT from which to start the MA filter window. The MA filter forms an output signal by integrating the energy within a window whose length in IFFT bins is the same as the duration of the guard interval. For each shift of the window, a new output is produced. CIR Estimator 404: This block estimates the start time of the time domain impulse response of the channel from the output of the MA filter. This start time is the filter output index for which the filter output is maximum. This start time is estimated relative to either the start time of the old CIR (the current time base) or a trial start time provided by the symbol time adjustment estimator block 206.

Main Path TOA Estimator 405: When enabled, this block finds and outputs the number of the IFFT bin with maximum energy relative to the bin number associated with the current time base. This block takes as its input the output buffer of the IFFT and the current time base from the PAT controller 406.

PAT Controller 406: The PAT controller 406 controls all the PAT output processor sub-blocks. It converts the slope offset at input 271 from samples to IFFT bins to determine the current time base or converts the trial adjustment input 211 into bins to give a reference to the CIR Estimator block 404. It also determines from the current time base or the trial adjustment bin the start bin number of the IFFT output for the MA filter. Finally, it incorporates a switch to determine whether the output of the PAT is to come from the Main path TOA estimator 405 or the CIR estimator 404. The PAT controller can therefore force the PAT output processor 210 to operate in different modes. The different modes are altered by a control signal received from the symbol timing adjustment estimator 206. Specifically, since the CIR start time from the CIR Estimator 404 is computed relative to a time base provided by the PAT controller, the PAT controller can cause the CIR Estimator 404 to output the time of arrival (TOA) of any of the propagation paths that exist in the transmission channel. In another mode of operation the PAT controller, when given a prospective TOA, can determine whether or not there exists a path on the channel with the given TOA. It can do this by providing the CIR Estimator 404 with the test TOA as a time reference. If the path exists, then the CIR Estimator 404 would produce a CIR relative start time close to zero.

5.3. Symbol Time Adjustment Estimator

The symbol time adjustment estimator effectively utilizes adjustments to the CSST as generated from the coarse symbol acquisition processor 202, the guard adapted matched filter processor 204 or the PAT output processor 210. Correspondingly the switch 208 is arranged to receive an input from either the coarse symbol acquisition processor 202, the output of the guard adapted match filter 204 or the PAT 210 from the respective connecting channels 207.1, 207.2, 207.3.

In the first symbol time tracking period (after all timing and frequency loops have locked), the symbol time tracker runs the PAT asking it to provide only the TOA of the main path. The main path TOA goes to the guard adapted matched filter processor 204 where it is used to set up the taps and excitation of the matched filter for the next symbol tracking period. The main path TOA also goes to channel 207.3 of the switch 208 from where it proceeds to the symbol time adjustment estimator 206. This block uses the switch output to find the adjustment that needs to be made to the symbol sample counter or NCO 214. When the value in this counter reaches a preset value, the FFT Trigger Pulse Generator 212 generates a start pulse for the FFT block 108. The switch 208 contact moves to channel 207.2 in readiness for the next tracking period. The guard adapted matched filter processor 204 accumulates its output for a preset number of COFDM symbol periods. At the end of this period, it outputs an 'earliest path TOA' to channel 207.2 of switch 208 and so on to the symbol time adjustment estimator 206 which uses this value to compute the required adjustment to the NCO 214. As described in the flow diagram of FIG. 9, if this required adjustment is greater than a preset value, (called JITTER in FIG. 9), then the PAT is summoned to test the 'earliest path TOA' to determine if there is a valid propagation path with this TOA. When the PAT is summoned to test a prospective TOA, the switch 208 contact moves to channel 207.3. If the test is in the affirmative, the PAT output processor 210 regurgitates the 'earliest path TOA' which it tested and so the symbol time adjustment estimator 206 picks it up and allows the NCO 214 adjustment to be made via adder 216. If the test fails, the PAT output processor 210 outputs a zero which results in a zero adjustment in the symbol time thereby disallowing the adjustment. Note that this functionality (of testing excessive adjustments) is not fully shown in FIG. 6.

5.4. Coarse Synchronisation Detector

Figure 8:
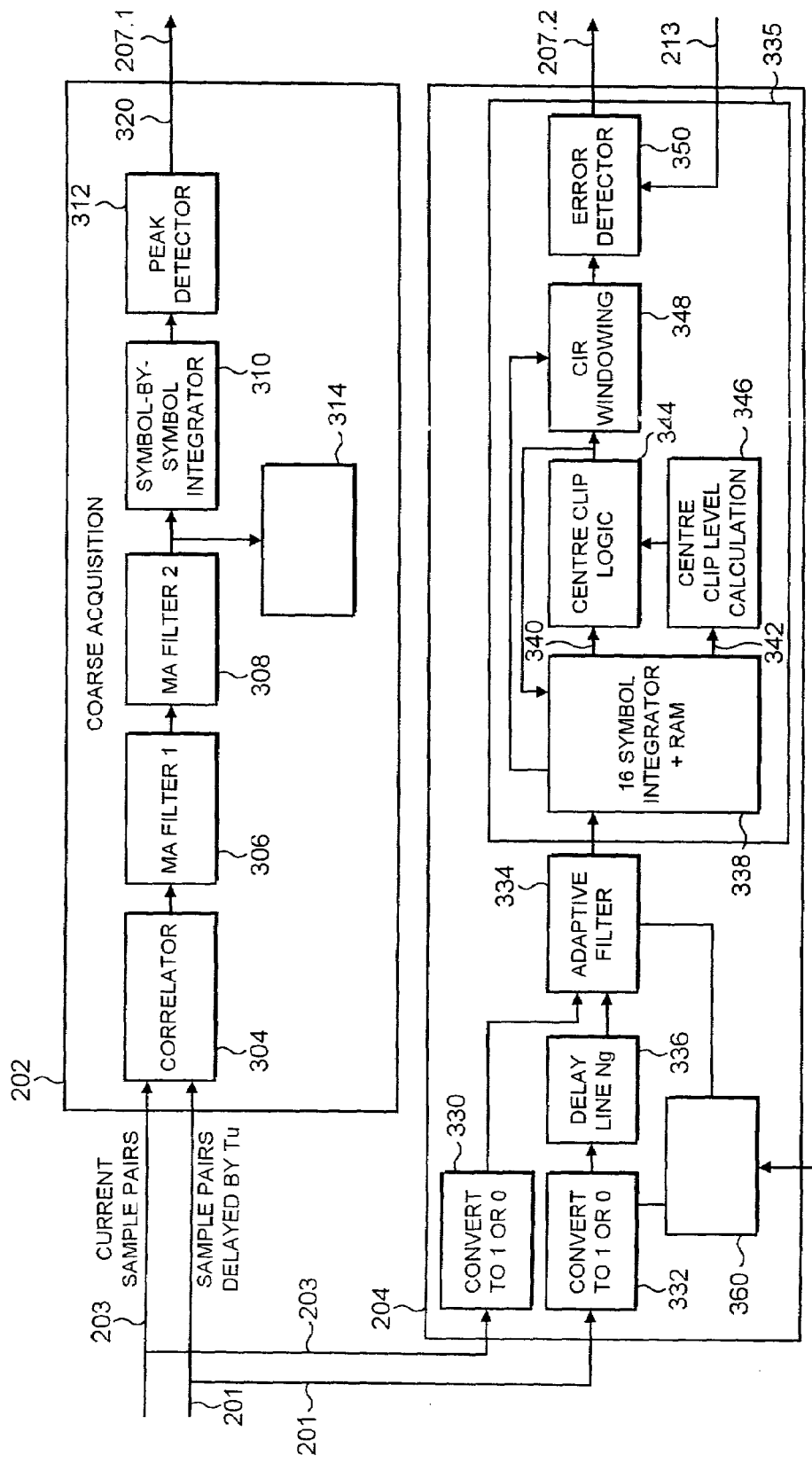
FIG. 8 is a schematic block diagram of a coarse acquisition processor and a guard adapted filter processor which form part of the FFT symbol timing recovery of FIG. 6.

As shown in FIG. 8 the coarse acquisition processor comprises a correlator 304 which is arranged to receive the set of received signal samples corresponding to the COFDM symbol via a first input 203. The set of received signal samples are also received via a second input 201 but delayed by a period $T_u$ corresponding to the temporal length of the data bearing signal samples of the COFDM symbol from the sample delay block 200. The correlator 304 is arranged to cross correlate the two signal samples from the received signal as previously explained with reference to the previously proposed detector shown in FIG. 2. The correlator 304 then feeds the result of the correlation to a first Moving Averaging (MA) filter 306 which integrates the output of the correlation. This is in turn fed to a second moving averaging filter 308 which integrates the output of the first moving averaging filter. The output of the second moving averaging filter 308 is then integrated on a symbol by symbol basis by a symbol-by-symbol integrator 310. The integrator 310 serves to integrate the output signal from the second MA filter 308 over successive COFDM symbols so that a combined output is produced for these successive symbols. The output of the integrator 310 is then fed to a peak detector 312. The peak detector 312 is arranged to generate a peak value of the symbol integrator. A peak detector 312 then determines the relative displacement which corresponds to the peak of the integrated output signal from the integrator 310 therefore providing a coarse indication of an SST point to the symbol timing adjustment estimator 206 via channel 207.1 of switch 208.

5.5. Guard Adapted Matched Filter Processor

The Guard Adapted Matched Filter Processor 204 operates on the time domain samples prior to the FFT block 108. It matches Ng samples on the delayed sample stream with Ng samples from the undelayed sample stream. The delayed and undelayed sample streams are taken from the output and input of the Delay block 200, respectively. The guard adapted matched filter processor 204 determines an adjustment to the CSST from an 'Earliest Path TOA' which is used by the symbol time adjustment estimator 206 and also another value which is used by the channel corrector block.

The guard adapted matched filter processor 204 provides an improved estimate of the SST by utilising a transversal filter which is adaptively matched to the guard interval of successive COFDM symbols. An end of symbol marker is derived for the dominant multi-path component from the main path TOA provided by the PAT output processor 210. This is used to locate the start of the guard interval on each symbol. For symbol m, the received signal either side and including its guard interval, which comprises $3N_g$ of samples, are used to set the taps $f_m(i)$ of the transversal filter. In effect, therefore the received signal is correlated with respect to $3N_g$ worth of samples. This therefore allows the guard adapted matched filter tracker to estimate any errors in the CSST. Once the filter taps have been set the block $r_m(n)$ of the last $N_g$ samples of the symbol, which were copied to form the guard interval are filtered by the matched filter to produce an output signal. As the filter is excited with these samples, a pulse train $h_m(n)$ representing an approximation to the channel impulse response (CIR) during symbol m is produced at the output since the filter is nominally matched to its excitation. This is represented in equation (2).

$$h_m(n) = \sum_{i=0}^{N_g-1} f_m(n-i)r(n-i) \quad (2)$$

The guard adapted matched filter processor 204 is—arranged to receive the set of received signal samples and the delayed set of received signal samples from the first and second inputs 201, 203. The received signal samples from the first and second inputs 201, 203 are fed respectively to first and second binary converters 330, 332. The output from the binary converter is fed to a first input of an adaptive matched filter 334. A second input to the adaptive matched filter is fed with samples from the output of the binary converter 332 via a delay line 336 which serves to delay each sample by a period corresponding to the number of samples within the guard period. The output of the adaptive matched filter 334 is received at an integrator 338 forming part of a synchronisation detection processor 335. The integrator 338 serves to integrate the output of the matched filter, the integrated output being presented on first and second outputs 340, 342 to a centre clip processor 344 and a centre clip level calculator 346. As explained in [1], the centre clip processor and the centre clip level calculator 344, 346 are arranged to pre-process the output of the adaptive matched filter which has been integrated by the integration processor 338. The effect of cancelling various peaks of the adaptive filter output reduces the possibility of a false indication of the synchronisation point. As such the performance of the synchronisation detector 335 is improved particularly in the presence of noise.

The pre-processed output from the centre clip processor is then fed to a channel impulse response windowing processor 348. The windowing processor 348 provides a further pre-processing operation to the effect of isolating an analysis window within which the pre-processed output of the adaptive filter produces the maximum energy. It is within this analysis window that a peak output of the adaptive matched filter is determined by an error detection processor 350 with respect to the current time base derived from the current value of the NCO 214 through a feedback channel 213. The operation of the guard adapted matched filter processor 204 is controlled by a controller 360.

The error detector 350 produces an adjustment to the CSST which is fed to channel 207.2 of switch 208 and selected as appropriate by the symbol timing adjustment estimator 206. The pre-processing operations performed by each of these processors are explained in more detail in [1].

6. Summary of Operation

The operation of the symbol time adjustment estimator 206 will now be explained with reference to the flow diagram shown in FIG. 9. Following boot-up S1, the switch 208 is configured to receive a signal from the coarse symbol acquisition processor 202 as represented at step S2 in FIG. 9. Before and during coarse symbol acquisition, the switch contact is set to channel 207.1. After acquisition it moves to channel 207.3 in readiness for the first symbol time tracking period.

The coarse symbol acquisition processor 202 is operable to generate a signal representative of the TOA of the main path of the channel impulse response which is received by the symbol time adjustment estimator 206. The symbol time adjustment estimator 206 operates in combination with the NCO 214 and the FFT trigger pulse generator 212 to generate a first estimate of the SST provided to the FFT processor 108. At this stage, slope correction is performed as well as channel estimation using by the pilot assisted channel estimator 252. In addition, frequency errors are calculated. This forms part of an initialization phase which also includes a step of carrier frequency recovery formed by process step S6 in combination with the decision step S8 which operate in a feedback loop to determine whether carrier frequency has been correctly recovered.

Once the carrier lock has been achieved, the pilot symbols can be recovered from the frequency domain representation of the COFDM symbol (S10).

The PAT output processor 210 operates to determine the TOA of the main path from the pilot assisted CIR estimate at step S12. At this point the switch 208 is arranged to connect the channel 207.3 from the PAT output processor 210 to the input of the symbol time adjustment estimator 206. Once the TOA of the main path has been determined, the guard signal samples can be identified and the matched filter of the guard adapted matched filter processor 204 can be adapted so that the taps correspond accurately to the samples from the guard period. This is effected at step S14. Correspondingly at step S16, the symbol timing adjustment estimator 206 sets the switch 208 to receive the adjustment from the guard adapted matched filter processor 204. The symbol timing adjustment estimator 206 then operates to adjust the symbol timing in accordance with the adjustment produced when the guard adapted matched filter processor 204 has gone through its integration period and its output processed to determine any adjustments to the CSST.

Figure 9:
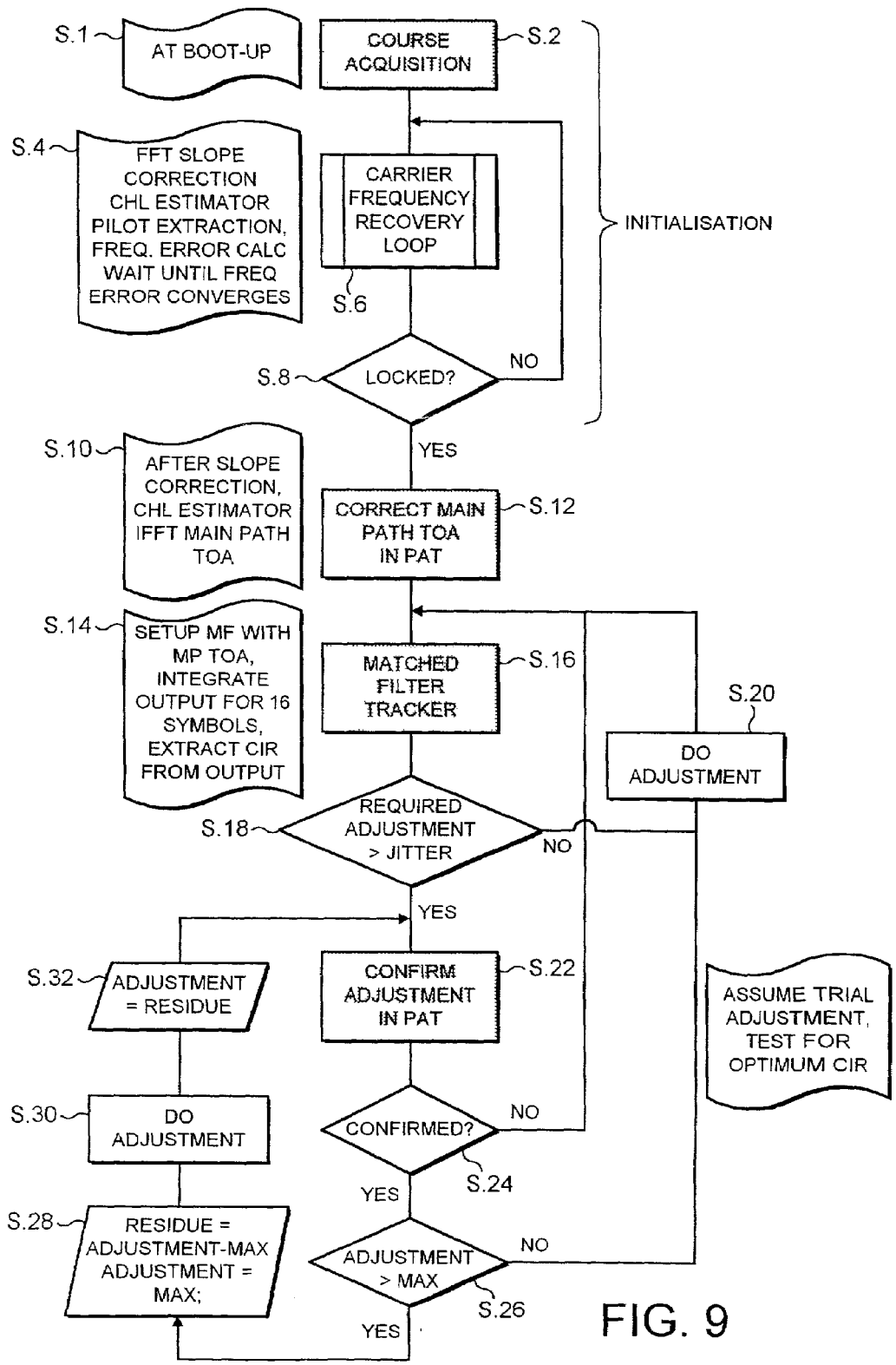
FIG. 9 is a flow diagram representing the operation of the receiver to estimate and then track the symbol synch time.

The remaining parts of the flow diagram in FIG. 9 represent the operation of the adjustment to the CSST within the accuracy of ±R samples which determines the accuracy of the PAT performed from the IFFT of the pilot signal samples. As explained, a jitter threshold is set of an integer value just greater than or equal to the resolution R. Accordingly at step S18, the symbol time adjustment estimator 206 determines if the required adjustment to the CSST as determined by the guard adapted match filter 204 is above the jitter threshold. If the required adjustment to the CSST is not above the jitter threshold then the adjustment is performed at S20. As explained above however, in order to reduce the likelihood of an erroneous adjustment as a result of the remnants of cancelled ghost echoes and/or noise, the PAT is used to confirm—any big adjustments. Therefore, if the required adjustment to the CSST is above the jitter threshold, then the symbol time adjustment estimator 206 sends it as a trial adjustment to the PAT with instructions that it be tested as a trial adjustment. At step S22, the PAT controller 406 uses this trial adjustment to set up the time base for the CIR Estimator 404 and also combines the trial adjustment with the slope correction to provide the start bin for the MA filter 402. At step S24, the PAT output processor 210 output is tested to confirm whether or not the new adjustment returned by the PAT lies within the jitter threshold. If it is then an adjustment to the CSST equal to the trial adjustment is effected subject to the adjustment not exceeding the maximum adjustment allowed.

In steps S.26 to S.32 of the flow diagram, it is also shown that even when some prospective TOAs are confirmed by the PAT, they might produce an adjustment which is too excessive to be made in one tracking period. This was explained in section 4.9. At step S.26 the symbol timing adjustment estimator 206 determines whether the adjustment returned by the PAT is greater than a predetermined maximum. In this case, the maximum adjustment allowed is made at step S.28 and S.30 and the residue (S.28) is fed back into the PAT as a 'relative TOA' i.e. relative to the maximum adjustment just made (S.32). In this case, the switch 208 contact stays on channel 207.3. In the following tracking period, the PAT would normally confirm and regurgitate this 'relative TOA' which would allow the residual adjustment to be made.

When the PAT finishes with the whole adjustment including any residues, the switch contact is moved back to channel 207.2 for the next tracking period. Then the guard adapted matched filter processor 204 is run for the following tracking period.

In summary, the symbol tracker starts out by finding the TOA of the main path using the PAT. It then uses the matched filter tracker to find the TOA of the earliest arriving path. If the difference between this TOA and that of the main path is too much, it asks the PAT to confirm that there is indeed a propagation path with such a TOA. If this is confirmed, then the adjustment is made subject to not exceeding the maximum adjustment allowed—in which case only the maximum allowed is done and the residue done in the following tracking period. In subsequent tracking periods, the matched filter tracker is the main tracker. When it asks that an adjustment be made, the symbol time adjustment estimator 206 checks the adjustment—if it is less than a preset value (JITTER) it is done otherwise, the PAT is called on to test that the TOA and by implication the adjustment is valid. It is then made if it is valid otherwise it is disallowed.

Figure 10:
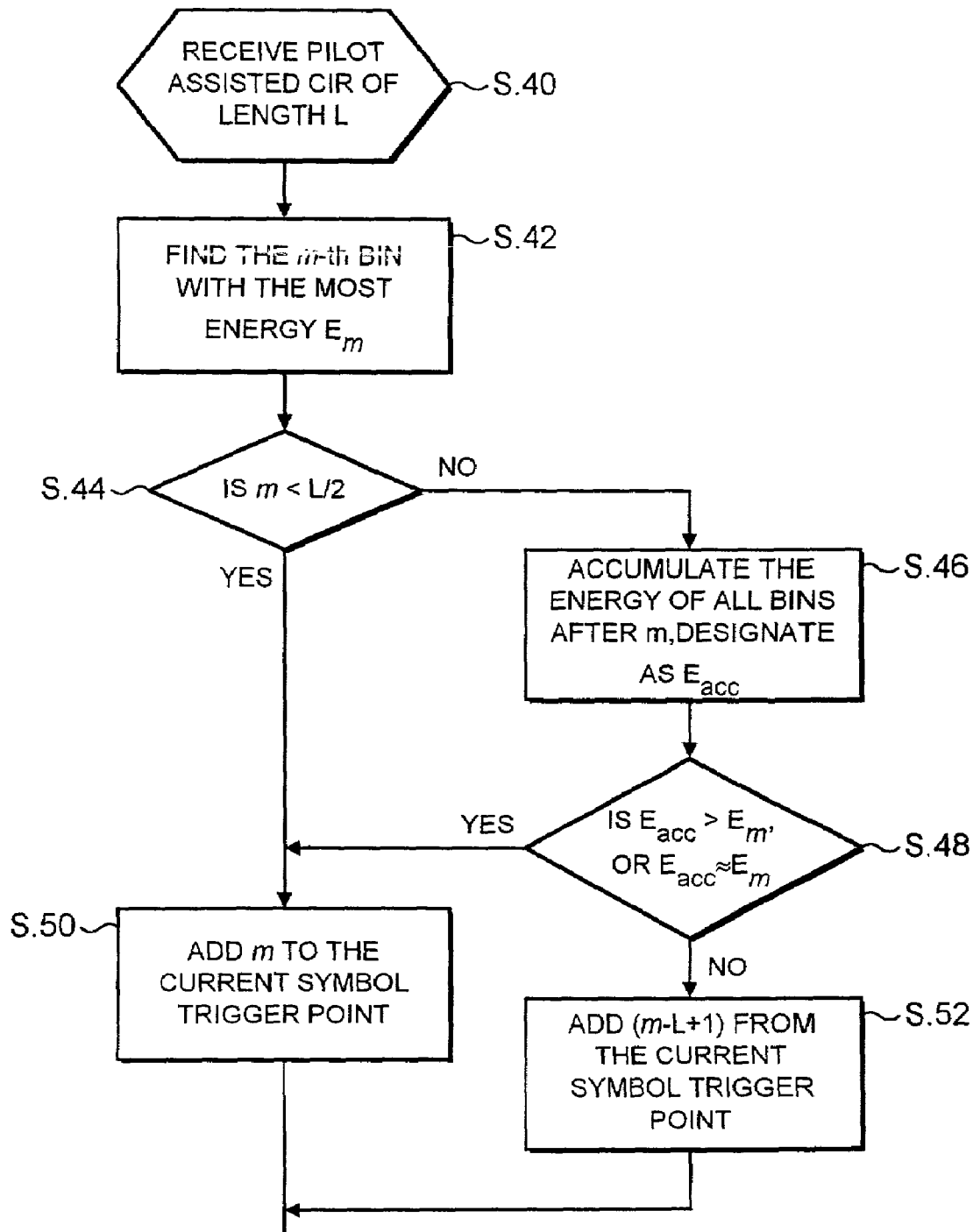
FIG. 10 is a flow diagram representing a process of estimating the time of arrival of the main received signal path, within the pilot assisted tracker.

FIG. 10 provides a more detailed flow diagram of the operation of the detection of the main path TOA in the PAT as explained in section 4.5. In FIG. 10 as a first step S40, the IFFT output of the pilot as produced at the output of the pilot IFFT processor 256 is read in. At step S42 each of the bins is analysed and the m-th bin with the most energy designated $E_m$ is identified. At decision step S44 it is determined whether the value of m is greater than L/2 where for the preferred embodiment L being the IFFT length is 256. If it is not then the PAT outputs m so that the symbol time adjustment estimator 206 can adjust the symbol synch time by adding m to the current value of NCO 214 (S.50). If it is, then at step S46 the energy in all of the bins after the m-th bin is accumulated to produce an accumulated energy $E_{ACC}$. At decision step S48, it is determined whether the accumulated energy $E_{ACC}$ is greater than the energy of the main path or approximately equal to the energy of the main path $E_m$. If it is then the PAT outputs m so that the symbol time adjustment estimator 206 can adjust the symbol synch time by adding m to the current value of NCO 214 (S.50). If it is not, then the PAT outputs m−L+1 so that the symbol time adjustment estimator 206 can adjust the symbol synch time by adding m−L+1 to the current value of NCO 214 (S.50).

Various modifications may be made to the example embodiments herein before described without departing from the scope of the present invention. In particular, it will be appreciated that the combination of a pilot assisted tracker and a guard adapted matched filter processor can be applied to facilitate synchronisation with any signal having a guard interval with data repeated from data bearing signal samples of the transmitted signal.

Furthermore it will be appreciated that the term pilot should be interpreted broadly as meaning any signal or data symbols which are transmitted with the data to be communicated and which are known to the received.

The present invention is not limited to DVB, COFDM or OFDM or even frequency division multiplexing. Accordingly embodiments of the present invention can—provide a receiver for determining a synch time for recovering data from data bearing signal samples, the signal samples including a guard period which carries data repeated from a data bearing part. The receiver may comprise a pilot assisted tracker which is operable to determine an adjustment to the synch time from a pilot assisted channel impulse response estimate. A guard adapted matched filter processor comprises a filter and a filter controller. The controller is operable to adapt the impulse response of the filter to the signal samples from the guard period, to excite the filter with the symbol signal samples to generate an output signal which provides a further representation of the channel impulse response. A symbol time adjustment estimator is operable to adjust the synch time in accordance with the adjustment provided by at least one of the pilot assisted tracker and the guard adapted matched filter processor.

7. REFERENCES

[1] Co-pending UK patent applications serial numbers 0027423.3 and 0027424.1.

[2] Fabrizio Frescura et al., "DSP based OFDM demodulator and equalizer for professional DVB-T receivers", IEEE Trans. On Broadcasting, Vol.45, No.3, September 1999.

The invention claimed is:

1. A receiver for determining a synch time for recovering data from signal samples, said signal samples including a portion corresponding to a guard period which carries data repeated from a data bearing portion of said signal samples, said receiver comprising:

a pilot assisted tracker operable to determine an adjustment to said synch time from a pilot assisted channel impulse response estimate, a guard adapted matched filter processor comprising a filter and a filter controller operable to set the impulse response of said filter to the signal samples from said guard period, to excite said filter with said signal samples to generate an output signal which provides a further representation of said channel impulse response, and to generate an adjustment to said synch time from said further representation of said channel impulse response, and a synch timing adjustment estimator operable to adjust said synch time in accordance with the adjustment provided by at least one of said pilot assisted tracker and said guard adapted matched filter processor.

2. A receiver as claimed in claim 1, wherein said guard adapted matched filter processor is operable to generate said adjustment to said synch time in accordance with an earliest signal path revealed in said further representation of said channel impulse response.

3. A receiver as claimed in claim 1, wherein said pilot assisted tracker includes a channel impulse response estimator operable to generate said pilot assisted estimate of the channel impulse response through which the signal samples have passed using known signals received with said signal samples.

4. A receiver as claimed in claim 1, further comprising:

a coarse synch timing estimator operable to provide a first estimate of said synch time, wherein said pilot assisted tracker is operable to determine the adjustment to said synch time with respect to said first estimate of said synch time.

5. A receiver as claimed in claim 4, wherein said pilot assisted tracker is operable to estimate the adjustment to said synch time by determining a signal sample of maximum amplitude of said pilot assisted channel impulse response estimate with respect to said first estimate of said synch time.

6. A receiver as claimed in claim 4, wherein said pilot assisted tracker is operable to determine the adjustment to said synch time by determining which of a pre-determined number L of samples representing said pilot assisted channel impulse response estimate has the greatest magnitude with respect to the temporal position of said first estimate of said synch time, and having determined that the m-th sample having the greatest magnitude and position m within the said predetermined number L of samples representing the pilot assisted channel impulse response estimate, further to determine whether m is greater than half said predetermined number L of samples and if so, said timing adjustment estimator is operable to determine said adjustment to said sync time by adding an amount corresponding to the sample time position of the m-th sample having the largest magnitude to the current synch time, else to determine said adjustment to said synch time by adding an amount corresponding to the difference between sample time position of the m-th sample having the largest magnitude from the sample time corresponding to said predetermined number L−1.

7. A receiver as claimed in claim 6, wherein said timing adjustment estimator is operable to determine said adjustment to said synch time if the m-th sample having the greatest magnitude is greater than half said predetermined number L of samples representing the channel impulse response estimate, by determining a total amount of energy in the samples of said pilot assisted channel impulse response after said sample m having the greatest magnitude, and if said total amount of energy is greater than or substantially equal to the energy of said sample of greatest magnitude, said timing adjustment estimator is operable to determine said adjustment to said synch time by adding an amount corresponding to the time position of the m-th sample having the largest magnitude, and otherwise to determine the adjustment to said synch time by adding an amount corresponding to the difference between sample time position of the m-th sample having the largest magnitude from the sample time corresponding to said predetermined number L−1.

8. A receiver as claimed in claim 1, wherein said pilot assisted tracker includes a moving averaging filter which is operable to receive said pilot assisted channel impulse response and to form an average energy output signal representing an amount of energy within a window of length equal to the guard period with respect to time as said pilot assisted channel impulse response passes through said moving averaging filter, and operable to determine the adjustment to said synch time from the highest value of said average energy output signal.

9. A receiver as claimed in claim 8, wherein said timing adjustment estimator is operable to compare the amount of the adjustment to said synch time with an adjustment threshold and if said adjustment amount is greater than said adjustment threshold, introducing a trial adjustment in said pilot assisted tracker, said pilot assisted tracker being operable to start said moving averaging filter in correspondence with said amount of said trial adjustment, and said timing adjustment estimator is operable to determine a new value for said synch timing adjustment and if said new value has changed with respect to the trial value of said synch timing adjustment by less than or equal to said adjustment threshold, adjusting said synch time by an amount of said trial value and other wise not adjusting said synch time.

10. A receiver as claimed in claim 9, wherein said adjustment threshold corresponds to an amount of time domain resolution provided in said pilot assisted channel impulse response estimate.

11. A receiver as claimed in claim 1, wherein said timing adjustment estimator is operable to compare said adjustment with a predetermined maximum value, and if greater, said timing adjustment estimator is operable to adjust said synch time by said predetermined maximum amount, and to form a residual adjustment from the difference between said adjustment and said predetermined maximum value, said residual adjustment being passed to said pilot assisted tracker during the following tracking period as a trial adjustment for confirmation and use in further adjustment to said synch time.

12. A receiver as claimed in claim 11, wherein said synch timing adjustment estimator is operable to force said pilot assisted tracker to adjust said synch time with respect to said residual adjustment and to continue adjustments in subsequent tracking periods, until the amount by which said synch time is adjusted is less than said adjustment threshold, and when said adjustment value is less than said adjustment threshold, adjusting said synch time in accordance with said output signal from said guard adapted matched filter processor.

13. A receiver as claimed in claim 1, wherein said signal samples are 15 representative of an orthogonal frequency division multiplexed symbol, said receiver further comprising:
a data detector operable to recover data from said symbol of signal samples by performing a frequency domain transformation of said symbol of signal samples determined with respect to said synch time.

14. A receiver as claimed in claim 13, wherein said orthogonal frequency division multiplexed symbol includes in said frequency domain a plurality of pilot signal samples, said pilot assisted channel impulse response estimator receiving said pilot signal samples from said frequency processor and is operable to form said pilot 25 assisted channel impulse response estimate by forming a time domain transformation of said pilot signal samples.

15. A receiver as claimed in claim 13, wherein said symbol is generated using multi-carrier modulation such as OFDM, DVB-T, ISDB-T, DAB, DRM, DMT etc, said receiver being operable to detect and recover data from said symbol using said synch time.

16. A method of determining a synch time for recovering data from signal samples, said signal samples including a portion representing a guard period which includes data repeated from a data bearing portion of said signal samples, said method comprising:
generating a pilot assisted estimate of the channel impulse response through which the radio signal samples have passed,
determining an adjustment to said synch time from said pilot assisted channel impulse response estimate,
setting the impulse response of a filter to a block of signal samples from one guard interval before to one guard interval after the said guard period of said signal samples exciting said filter with said signal samples to generate an output signal which provides a further representation of said channel impulse response,
determining an adjustment to said synch time from an earliest of the signal paths revealed in said further representation of said channel impulse response, and
adjusting said synch time in accordance with the adjustment generated from one of the pilot assisted channel impulse response and the further representation of the channel impulse response.

17. A computer program providing computer executable instructions, which when loaded onto a computer configures the computer to operate as a receiver as claimed in claim 1.

18. A computer program providing computer executable instructions,
which when loaded on to a computer causes the computer to perform the method according to claim 16.

19. A computer program product having a computer readable medium recorded thereon information signals representative of the computer program claimed in claim 17.

20. A receiver for determining a synch time for recovering data from signal samples, said signal samples including a portion representing a guard period which includes data repeated from a data bearing portion of said signal samples, said receiver comprising
means for generating a pilot assisted estimate of the channel impulse response through which the radio signal samples have passed,
means for determining a pilot assisted adjustment to said synch time from said pilot assisted channel impulse response estimate,
means for setting the impulse response of a filter to a block of signal samples from one guard interval before to one guard interval after the said guard period of said signal samples exciting said filter with said signal samples to generate an output signal which provides a further representation of said channel impulse response,
means for determining an adjustment to said synch time from an earliest of the signal paths revealed in said further representation of said channel impulse response, and
adjusting said synch time in accordance with the adjustment generated from one of the pilot assisted channel impulse response and the further representation of the channel impulse response.

* * * * *